(12) United States Patent
Mori

(10) Patent No.: US 10,593,300 B2
(45) Date of Patent: Mar. 17, 2020

(54) DISPLAY DEVICE AND METHOD OF CONTROLLING THE SAME

(71) Applicant: CANON KABUSHIKI KAISHA, Tokyo (JP)

(72) Inventor: Makiko Mori, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/636,181

(22) Filed: Jun. 28, 2017

(65) Prior Publication Data
US 2018/0005606 A1 Jan. 4, 2018

(30) Foreign Application Priority Data
Jun. 30, 2016 (JP) ................. 2016-131037

(51) Int. Cl.
G09G 5/37 (2006.01)
G09G 5/02 (2006.01)
G09G 5/00 (2006.01)
G09G 5/14 (2006.01)
G09G 5/10 (2006.01)
G06F 3/14 (2006.01)
G09G 5/377 (2006.01)

(52) U.S. Cl.
CPC .......... *G09G 5/377* (2013.01); *G06F 3/1431* (2013.01); *G06F 3/1454* (2013.01); *G09G 5/005* (2013.01); *G09G 5/02* (2013.01); *G09G 5/10* (2013.01); *G09G 5/14* (2013.01); G09G 2320/0653 (2013.01); G09G 2320/0666 (2013.01); G09G 2340/12 (2013.01); G09G 2354/00 (2013.01); G09G 2360/02 (2013.01)

(58) Field of Classification Search
CPC combination set(s) only.
See application file for complete search history.

(56) References Cited

U.S. PATENT DOCUMENTS

| 2007/0091432 A1* | 4/2007 | Garner | H04N 5/74 359/459 |
|---|---|---|---|
| 2009/0231353 A1* | 9/2009 | Han | G03G 15/502 345/581 |
| 2013/0141475 A1* | 6/2013 | Kotani | G09G 5/001 345/690 |

(Continued)

FOREIGN PATENT DOCUMENTS

| JP | 2015143779 A | 8/2015 |
|---|---|---|
| JP | 2015-179940 A | 10/2015 |

OTHER PUBLICATIONS

The above foreign patent document was cited in the Jan. 30, 2020 Japanese Office Action, a copy of which is enclosed without an English Translation, that issued in Japanese Patent Application No. 2016-131037.

*Primary Examiner* — Wesner Sajous
(74) *Attorney, Agent, or Firm* — Cowan, Liebowitz & Latman, P.C.

(57) ABSTRACT

A display device receives, from an external device, information set on a settings screen that is displayed on the external device and that allows settings in ranges wider than ranges settable on a settings screen constituting a part of a projected image. The display device then changes settings in accordance with the received information. As a result, a degree of freedom in adjustment of the projected image can be increased.

30 Claims, 15 Drawing Sheets

(56) References Cited

U.S. PATENT DOCUMENTS

| | | | |
|---|---|---|---|
| 2014/0289542 A1* | 9/2014 | Ishizu | H04N 9/3155 |
| | | | 713/320 |
| 2014/0306890 A1* | 10/2014 | Ozawa | G03B 21/006 |
| | | | 345/157 |
| 2015/0212769 A1* | 7/2015 | Norota | G06F 3/1253 |
| | | | 358/1.15 |
| 2016/0269576 A1* | 9/2016 | Norota | H04N 1/00307 |
| 2016/0357270 A1* | 12/2016 | Chen | G09G 5/003 |

* cited by examiner

| COLOR NUMBER | COLOR DEFINITION(R,G,B) |
|---|---|
| 0 | (0,0,0) |
| 1 | (255,0,0) |
| 2 | (0,255,0) |
| 3 | (0,0,255) |
| 4 | (255,255,0) |
| 5 | (255,0,255) |
| 6 | (0,255,255) |
| 7 | (255,255,255) |

16B

| MENU ITEM | COLOR NUMBER |
|---|---|
| RED GAIN | 1 |
| GREEN GAIN | 2 |
| BLUE GAIN | 3 |
| RED OFFSET | 1 |
| GREEN OFFSET | 2 |
| BLUE OFFSET | 3 |
| RED GAMMA | 1 |
| GREEN GAMMA | 2 |
| BLUE GAMMA | 3 |

16C

| MENU ITEM | COLOR NUMBER |
|---|---|
| RED GAIN | 6 |
| GREEN GAIN | 2 |
| BLUE GAIN | 3 |
| RED OFFSET | 6 |
| GREEN OFFSET | 2 |
| BLUE OFFSET | 3 |
| RED GAMMA | 6 |
| GREEN GAMMA | 2 |
| BLUE GAMMA | 3 |

DISPLAY DEVICE AND METHOD OF CONTROLLING THE SAME

BACKGROUND OF THE INVENTION

Field of the Invention

The present invention relates to a display device and a method of controlling the same.

Description of the Related Art

Conventionally, a plurality of projection display devices (hereinafter also referred to as projectors) are used in combination to project an image with a resolution and size that cannot be achieved using one projector; this technique is called multi-screen projection. In multi-screen projection, it is important to make a joint between images projected by different projectors appear less distracting. In view of this, a method called edge blending is known; with edge blending, input images and projection ranges are set so that, in an image joint area, identical images are displayed in an overlapping manner across a predetermined width, and the overlapping display area is dimmed to have brightness that is similar to brightness achieved in an area with no overlapping images. Edge blending can make a joint between projected images appear less distracting. Within an input image, an area that is to be displayed in an overlapping manner and to undergo dimming processing will hereinafter be referred to as an edge blending area.

Projectors may display, for example, a menu screen for settings as an on-screen display (OSD) screen. When an OSD screen is displayed using multi-screen projection, edge blending is applied to an input image on which an image of the OSD screen has been superimposed. In this case, if a display area of the OSD screen overlaps an edge blending area, the visibility of the OSD screen decreases in an overlapping area, and hence the usability of the OSD screen decreases.

To address this problem, Japanese Patent Laid-Open No. 2015-179940 discloses a method of preventing a reduction in the visibility of an OSD screen by moving a display area of the OSD screen to avoid overlap with an edge blending area.

In Japanese Patent Laid-Open No. 2015-179940, an edge blending area is set to span a wide range, and when overlap with the edge blending area cannot be avoided even by moving an OSD screen, the OSD screen is reduced in size. However, with such a size reduction, a reduction in the visibility of the OSD screen is inevitable. The need to reduce the size of the OSD screen may be eliminated by, for example, limiting a range in which the edge blending area can be set; however, in this case, the configurability of the edge blending area decreases.

Furthermore, although the visibility of an OSD screen could possibly be reduced by image adjustment other than edge blending, such as adjustment of the brightness and contrast of an entirety of projected images, the method disclosed in Japanese Patent Laid-Open No. 2015-179940 cannot address this issue. Therefore, a range in which image adjustment can be set is limited.

SUMMARY OF THE INVENTION

The present invention has been made in view of the foregoing problems with conventional techniques, and provides a display device and a method of controlling the same that offer a high degree of freedom in adjustment of projected images.

According to an aspect of the present invention, there is provided a display device that displays an image by projecting the image, the display device comprising: a communication unit configured to communicate with an external device; and a control unit configured to receive information that has been set on a second settings screen displayed on the external device from the external device via the communication unit, and change settings in accordance with the information, the second settings screen allowing settings within second ranges that are wider than first ranges settable on a first settings screen constituting a part of the projected image.

According to another aspect of the present invention, there is provided a method of controlling a display device that displays an image by projecting the image, the method comprising: receiving information that has been set on a second settings screen displayed on an external device from the external device via a communication device, the second settings screen allowing settings within second ranges that are wider than first ranges settable on a first settings screen constituting a part of the projected image, and changing settings in accordance with the information.

According to a further aspect of the present invention, there is provided a display device that displays an image by projecting the image, the display device comprising: a communication unit configured to communicate with an external device; an operation unit that configures settings based on a first settings screen that allows settings within first ranges; and a control unit for receiving information that has been set on a second settings screen displayed on the external device from the external device via the communication unit, and changing settings in accordance with the received information, the second settings screen allowing settings within second ranges that are wider than the first ranges, and when settings that do not fall within the first ranges are configured in accordance with the information, displaying a warning screen by projecting the warning screen, or transmitting data for displaying the warning screen on the external device to the external device via the communication unit.

According to another aspect of the present invention, there is provided a method of controlling a display device that includes a communication device that communicates with an external device and an operation unit that configures settings based on a first settings screen that allows settings within first ranges, the method comprising: receiving information that has been set on a second settings screen displayed on the external device from the external device via the communication device, the second settings screen allowing settings within second ranges that are wider than the first ranges; changing settings in accordance with the received information; and when the information indicates settings that do not fall within the first ranges, either displaying a warning screen, or transmitting data for displaying the warning screen on the external device to the external device via the communication device.

According to a further aspect of the present invention, there is provided a non-transitory computer-readable medium having stored therein a program for causing a computer included in a display device that displays an image by projecting the image and comprises a communication device that communicates with an external device to function as: a control unit configured to receive information that has been set on a second settings screen displayed on the external device from the external device via the communication unit, and change settings in accordance with the information, the second settings screen allowing settings within second ranges that are wider than first ranges settable on a first settings screen constituting a part of the projected image.

According to another aspect of the present invention, there is provided a non-transitory computer-readable medium having stored therein a program for causing a computer included in a display device that displays an image by projecting the image and comprises a communication device that communicates with an external device and an operation device that configures settings based on a first settings screen that allows settings within first ranges, to function as a control unit for receiving information that has been set on a second settings screen displayed on the external device from the external device via the communication unit, and changing settings in accordance with the received information, the second settings screen allowing settings within second ranges that are wider than the first ranges, and when settings that do not fall within the first ranges are configured in accordance with the information, displaying a warning screen by projecting the warning screen, or transmitting data for displaying the warning screen on the external device to the external device via the communication unit.

Further features of the present invention will become apparent from the following description of exemplary embodiments with reference to the attached drawings.

BRIEF DESCRIPTION OF THE DRAWINGS

FIG. 16 shows color definitions used in the third embodiment.

DESCRIPTION OF THE EMBODIMENTS

Exemplary embodiments of the present invention will now be described in detail in accordance with the accompanying drawings. Although the following describes embodiments with specific configurations to facilitate the comprehension of the present invention, the present invention is not limited to the specific configurations disclosed by the embodiments. The present invention can be embodied based on other various configurations included in the scope of the claims.

For example, in the following description of the embodiments, the present invention is applied to a projector with transmissive LCDs. It should be noted, however, that a projector with transmissive LCDs is merely one example of a projection display device to which the present invention can be applied. For example, the present invention can be applied also to a projector with reflective LCDs, such as liquid crystal on silicon (LCOS) displays, and to a digital micromirror device (DMD) projector that does not use LCDs. Either a single-plane type or a three-plane type may be used. Note that an LCD and a DMD used in a projector are also referred to as light valves and optical modulators because they have a light amount adjustment function.

First Embodiment
<Overall Configuration>

Figure 1:
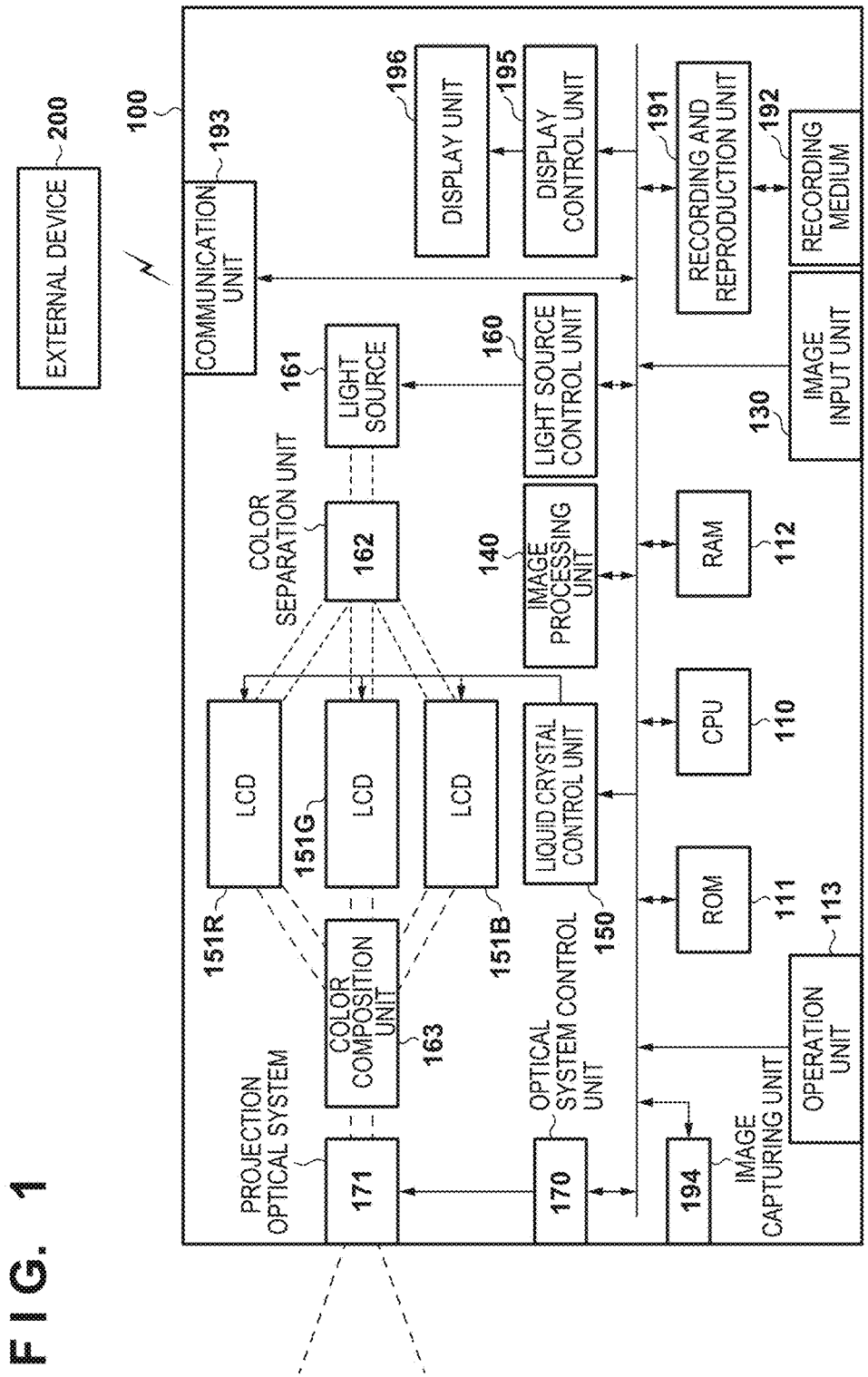
FIG. 1 is a block diagram showing an exemplary configuration of a projection display system according to embodiments.

FIG. 1 shows an overview of a projection system according to the present embodiment. The projection system includes a projector 100 and an external device 200.

The projector 100 according to the present embodiment is a transmissive liquid crystal projector of a three-plane type. A CPU 110, which is a main control unit, controls the operations of constituents of the projector 100 by reading control programs stored in, for example, a ROM 111 into a RAM 112 and executing the read control programs, thereby implementing various functions of the projector 100.

The ROM 111 stores not only control programs executed by the CPU 110, but also GUI data of later-described OSD screens, data of various test patterns for projection, various setting values, and so forth. The RAM 112 is used as a working memory when the CPU 110 executes control programs. A part of the RAM 112 may be used as a video memory.

The CPU 110 can temporarily store the following data to the RAM 112 and project the same: still image data and moving image data that have been reproduced by a recording and reproduction unit 191 from a recording medium 192, and still image data and moving image data that have been received via a communication unit 193. The CPU 110 can also temporarily store image data obtained by an image capturing unit 194 to the RAM 112, and record the same on the recording medium 192.

An operation unit 113 is composed of, for example, switches, dials, and a touchscreen that is disposed on a display unit 196, and accepts an instruction from a user. The CPU 110 detects an operation performed on the operation unit 113. As will be described later, the CPU 110 can also receive an instruction from a user from the external device 200 via the communication unit 193.

An image input unit 130 is a signal interface for receiving an image signal from an external apparatus. The image input unit 130 includes at least one of terminals corresponding to image signals that can be input, and examples of the terminals include a composite terminal, an S-terminal, a D-terminal, a component terminal, an analog RGB terminal, a DVI-I terminal, a DVI-D terminal, and an HDMI® terminal. In order to accept an image signal input via wireless communication, the image input unit 130 includes a wireless communication interface compliant with the standards of wireless LAN, near-field wireless communication, close proximity wireless communication, and so forth. It will be assumed that the formats of image signals that can be received by the image input unit 130 (that are supported by the projector 100) are set in advance.

The image input unit 130 supplies the received image signal to an image processing unit 140 in a digital data format. Therefore, when the image input unit 130 has received an analog image signal, it applies A/D conversion to the analog image signal, and then supplies the resultant signal to the image processing unit 140. Note that the image input unit 130 can receive an image signal from any external apparatus, and examples of the external apparatus include, but are not limited to, a personal computer, a tablet terminal, a digital camera, a digital video camera, a mobile telephone, an image recording device, and a game console.

The image processing unit 140 applies at least one of various types of image processing to the image signal, and transmits the resultant image signal to a liquid crystal control unit 150; examples of the image processing include processing for thinning out frames, frame interpolation processing, resolution conversion processing, processing for superimposing OSD images, distortion correction processing (keystone correction processing), and edge blending processing. Note that the types of image processing that can be applied by the image processing unit 140 are not limited to those listed above. The image processing unit 140 can apply the types of image processing listed above not only to the image signal supplied from the image input unit 130, but also to, for example, an image signal that has been reproduced from the recording medium 192.

The liquid crystal control unit 150 adjusts the transmittance of each pixel of LCDs 151R, 151G, and 151B by controlling a voltage applied to each pixel based on the image signal output from the image processing unit 140.

Each time the liquid crystal control unit 150 receives color image data corresponding to one frame from the image processing unit 140, it decides on values of voltages to be applied to the pixels of the LCD 151R based on red (R) component values of the color image data. For example, the liquid crystal control unit 150 can decide voltages so that pixels corresponding to an R component value of 0 have the lowest transmittance, whereas pixels corresponding to an R component value of 255 (in the case of 8 bits) have the highest transmittance. As the LCD 151R receives, as incident light, red light that has been separated by a color separation unit 162 from light emitted by a light source 161, red light with the intensity corresponding to the magnitude of R components of image data is transmitted through the LCD 151R under transmittance control performed by the liquid crystal control unit 150.

Similarly, the liquid crystal control unit 150 decides on values of voltages to be applied to the pixels of the LCD 151G based on green (G) component values of the color image data, and decides on values of voltages to be applied to the pixels of the LCD 151B based on blue (B) component values of the color image data. Accordingly, green light with the intensity corresponding to the magnitude of G components of image data is transmitted through the LCD 151G, and blue light with the intensity corresponding to the magnitude of B components of image data is transmitted through the LCD 151B. The operations of the liquid crystal control unit 150 and the configurations of the LCDs 151R, 151G, and 151B will be described later in more detail.

A light source control unit 160 controls ON/OFF and a light amount of the light source 161. The light source 161 emits light for projecting an image on a projection surface, such as a screen. Examples of the light source 161 include, but are not limited to, a halogen lamp, a xenon lamp, a high-pressure mercury lamp, and an LED.

The color separation unit 162 extracts red light, green light, and blue light from light emitted by the light source 161, and illuminates the LCD 151R, the LCD 151G, and the LCD 151B with red light, green light, and blue light, respectively. The color separation unit 162 includes, for example, a dichroic mirror and a prism. Note that when the light source 161 can emit red light, green light, and blue light independently of one another, the color separation unit 162 is unnecessary.

A color composition unit 163 composites together red light, green light, and blue light that have been transmitted through the LCDs 151R, 151G, and 151B, respectively, and emits the composite light to a projection optical system 171. The color composition unit 163 includes, for example, a dichroic mirror and a prism. As stated earlier, the liquid crystal control unit 150 controls the transmittance of each pixel of the LCDs 151R, 151G, and 151B so that the transmittance values correspond to the color components of image data output from the image processing unit 140. Accordingly, when the composite light emitted by the color composition unit 163 is formed by the projection optical system 171, an optical image indicated by the image data output from the image processing unit 140 is formed.

In accordance with an instruction from the CPU 110, an optical system control unit 170 controls the magnification and focal length of the projection optical system 171 by driving a varifocal lens and a focusing lens included in the projection optical system 171.

In accordance with an instruction from the CPU 110, the recording and reproduction unit 191 reads out still image data and moving image data recorded on the recording medium 192, which is a memory card, a USB memory, and the like, and stores the still image data and moving image data to the RAM 112. The recording and reproduction unit 191 also records image data obtained by the image capturing unit 194 and image data received from the communication unit 193 on the recording medium 192 in accordance with an instruction from the CPU 110. The recording and reproduction unit 191 includes a connector and a slot for loading the recording medium 192, and a circuit for accessing the recording medium 192.

The communication unit 193 includes at least one of a wired communication interface, such as a USB and an HDMI, and a wireless communication interface compliant with the standards of wireless LAN, near-field wireless communication, close proximity wireless communication, and so forth, and communicates with the external device 200. Examples of the external device 200 include, but are not limited to, a personal computer, a tablet terminal, a digital camera, a digital video camera, a mobile telephone, an image recording device, and a game console.

In the present embodiment, the external device 200, which performs communication via the communication unit 193, can transmit control commands for operating the projector 100, for example, control commands for power ON/OFF, switching input, and issuing an instruction to obtain and change various setting values. Therefore, a user can remotely control the projector 100 by operating the external device 200 instead of operating the operation unit 113.

Although any communication protocol may be used between the projector 100 and the external device 200, it will be assumed that the projector 100, for example, has a web server function and performs HTTP-compliant communication with a web client (e.g., a web browser) running on the external device 200. Note that the web server function can be implemented by the CPU 110 executing a web server program stored in the ROM 111. In this case, when a user of the external device 200 performs an operation on a GUI included in a web page that has been received from the projector 100 and is displayed on the external device 200, the external device 200 transmits a control command corresponding to the operation to the projector 100. The external device 200 can also transmit image data to the projector 100. When the external device 200 is connected to the projector 100 via the HDMI®, CEC communication may be performed.

The image capturing unit 194 is a camera that performs shooting in the direction of projection of the projection optical system 171. The image capturing unit 194 includes, for example, an imaging optical system, an image sensor that converts an optical image formed by the imaging optical system into an image signal, an A/D converter that applies A/D conversion to the image signal, and an actuator that drives a varifocal lens and a focusing lens of the imaging optical system. The CPU 110 controls the operations of the image capturing unit 194. The direction of shooting performed by the image capturing unit 194 is not limited to the direction of projection of the projection optical system 171, and may be opposite to the direction of projection.

A display control unit 195 controls display on the display unit 196. For example, the display control unit 195 causes the display unit 196 to display an operation screen for the projector 100, various message screens, and so forth in accordance with an instruction from the CPU 110.

The display unit 196 has, for example, a liquid crystal display or a similar display, and displays various types of information under control of the display control unit 195. The display unit 196 may be a touch-sensitive display. The display unit 196 may have, for example, a dot-matrix display, indicators included in buttons and switches that compose the operation unit 113, and indicators located in the vicinity of the buttons and switches.

In the present embodiment, at least one of the image processing unit 140, liquid crystal control unit 150, light source control unit 160, optical system control unit 170, recording and reproduction unit 191, and display control unit 195 may be constituted by one or more microprocessors. Alternatively, at least one of the image processing unit 140, liquid crystal control unit 150, light source control unit 160, optical system control unit 170, recording and reproduction unit 191, and display control unit 195 may be implemented by the CPU 110 executing a program(s) stored in the ROM 111.

<Basic Operations>

Figure 2:
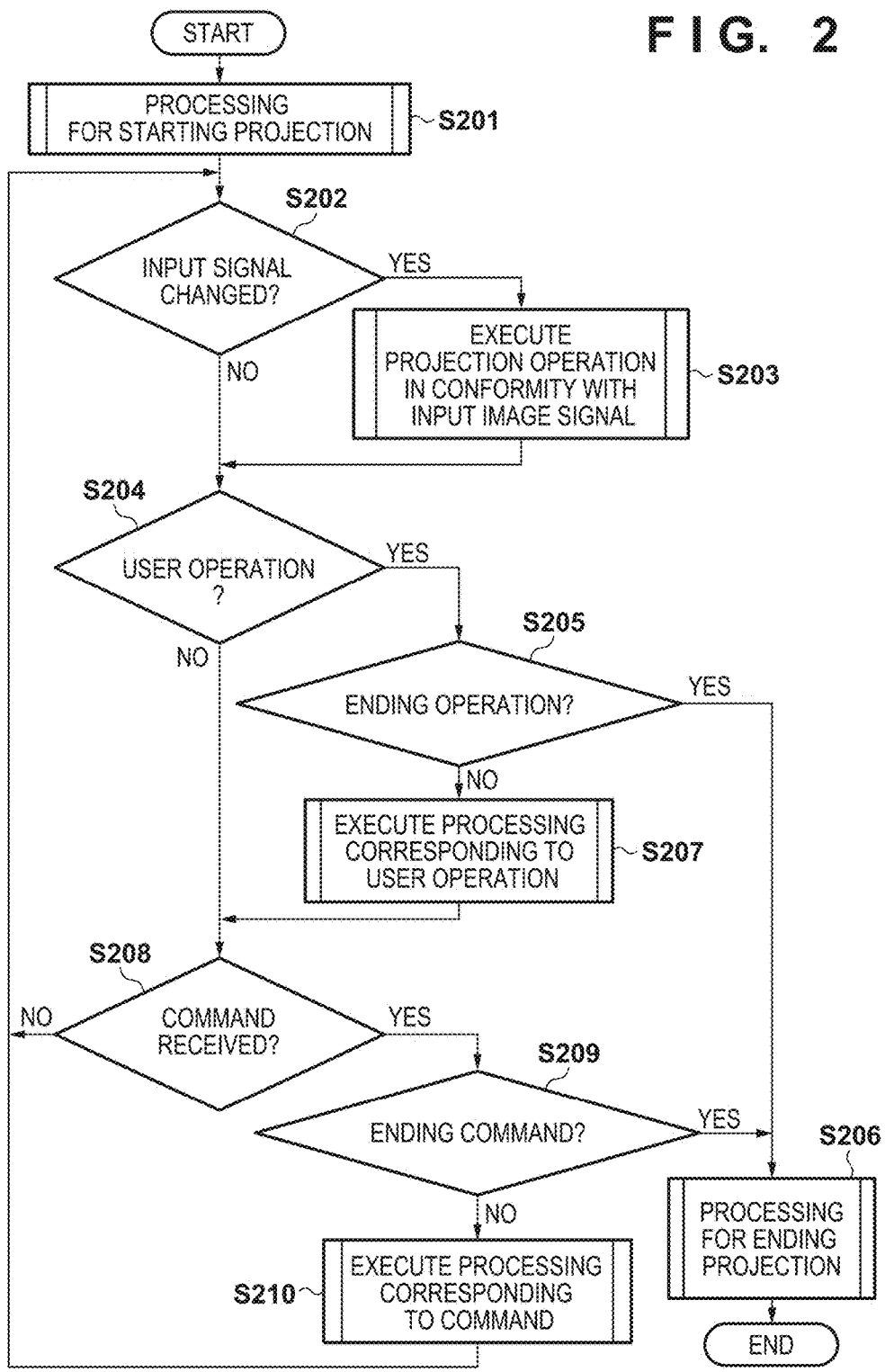
FIG. 2 is a flowchart of the basic operations of a projector shown in FIG. 1.

A description is now given of the basic operations of the projector 100 using a flowchart of FIG. 2.

The operations shown in FIG. 2 are basically executed by the CPU 110 controlling function blocks based on programs stored in the ROM 111. The flowchart of FIG. 2 may be started when a user issues an instruction to turn ON the power of the projector 100 via the operation unit 113 or the external device 200.

In step S201, the CPU 110 supplies power from a power unit to the constituents of the projector 100, and executes processing for starting the projection. Specifically, the CPU 110 causes the light source control unit 160 to light the light source 161, causes the liquid crystal control unit 150 to drive the LCDs 151R, 151G, and 151B, and configures operational settings of the image processing unit 140. The CPU 110 also establishes communication with the external device 200 via the communication unit 193.

In step S202, the CPU 110 determines whether an image signal input to the image input unit 130 has changed; it proceeds to step S203 if it determines that the input image signal has changed, and to step S204 if it does not determine that the input image signal has changed.

In step S203, the CPU 110 detects the resolution, frame rate, and the like of the image signal input to the image input unit 130, and decides on a sampling (obtainment) timing and image processing to be applied. Then, the CPU 110 executes a projection operation in conformity with the newly input image signal by changing the settings of the image processing unit 140 as needed.

In step S204, the CPU 110 determines whether a user operation has been performed on the operation unit 113; it proceeds to step S205 if it determines that the user operation has been performed, and to step S208 if it does not determine that the user operation has been performed.

In step S205, the CPU 110 determines whether the user operation represents an instruction to end the operations of the projector 100 (an ending operation); it proceeds to step S206 if it determines that the user operation is the ending operation, and to step S207 if it does not determine that the user operation is the ending operation.

In step S206, the CPU 110 executes processing for ending the projection, and turns OFF the power. Specifically, the CPU 110 causes the light source control unit 160 to switch OFF the light of the light source 161, causes the liquid crystal control unit 150 to stop driving the LCDs 151R, 151G, and 151B, and stores information that needs to be stored before power OFF to a nonvolatile memory (e.g., the ROM 111).

In step S207, the CPU 110 executes processing corresponding to the user operation, and proceeds to step S208. Examples of the user operation include, but are not limited to, instructions to make changes regarding image processing, change the magnification of projection, adjust focus, and switch an image signal to be projected (switch input).

In step S208, the CPU 110 determines whether a control command has been received from the external device 200 via the communication unit 193; it proceeds to step S209 if it determines that the control command has been received, and returns to step S202 if it does not determine that the control command has been received.

In step S209, the CPU 110 determines whether the received command represents an instruction to end the operations of the projector 100 (an ending command); it proceeds to step S206 if it determines that the received command is the ending command, and to step S210 if it does not determine that the received command is the ending command.

In step S210, the CPU 110 executes processing corresponding to the received control command, and returns to step S202. Examples of the control command include, but are not limited to, instructions to request information of the projector 100, make changes regarding image processing, change the magnification of projection, adjust focus, and switch an image signal to be projected (switch input).

Figure 3:
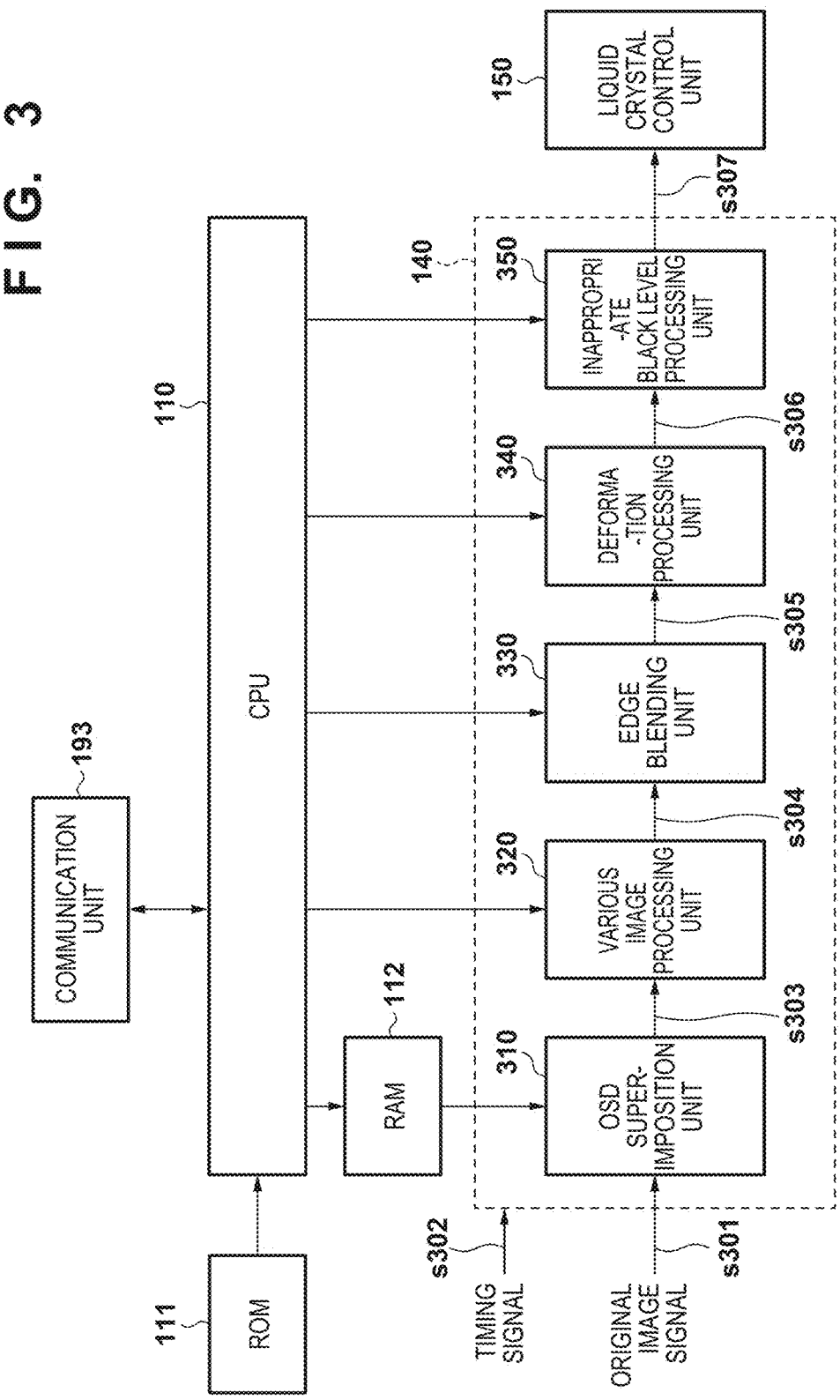
FIG. 3 is a block diagram showing an exemplary functional configuration of an image processing unit shown in FIG. 1.

FIG. 3 is a schematic diagram for describing the operations executed by the image processing unit 140 and the CPU 110 when applying image processing to an input image signal. An OSD superimposition unit 310, a various image processing unit 320, an edge blending unit 330, and a deformation processing unit 340 included in the image processing unit 140 are illustrated as individual function blocks that each represent image processing applied by the image processing unit.

The image input unit 130, recording and reproduction unit 191, communication unit 193, RAM 112, and the like input an original image signal s301 to the image processing unit 140. A timing signal s302 represents a vertical synchronization signal, a horizontal synchronization signal, a clock, and the like that are synchronous with the original image signal s301, and is supplied to the image processing unit 140 together with the original image signal s301. Each block in the image processing unit 140 may operate based on the timing signal s302, or based on another timing signal generated in the image processing unit 140.

To display an OSD screen superimposed on a projected image, the CPU 110 reads out data of the OSD screen from the ROM 111, and stores the data to a predetermined area of the RAM 112. The OSD screen is, for example, a message screen, a menu screen, or a settings screen, and the CPU 110 decides to display the OSD screen depending on an operation performed on the operation unit 113 and the operational status of the projector 100 (e.g., upon detection of an abnormality and when user input is necessary).

For example, the OSD superimposition unit 310 monitors data storage to the predetermined area of the RAM 112, and reads out stored data of the OSD screen. Then, the OSD superimposition unit 310 generates an OSD superimposition signal s303, which represents the OSD screen superimposed on a predetermined position of an image of the original image signal s301, and outputs the same to the various image processing unit 320. When the data of the OSD screen to be superimposed does not exist, the OSD superimposition unit 310 may output the original image signal s301 as-is as the OSD superimposition signal s303.

The various image processing unit 320 applies various types of image processing to the OSD superimposition signal s303 in accordance with an instruction from the CPU 110, and outputs a resultant image processing signal s304 to the edge blending unit 330. Examples of the image processing applied by the various image processing unit 320 include, but are not limited to, calculation of statistics information including histograms and average picture levels (APLs), IP conversion, frame rate conversion, resolution conversion, γ conversion, gamut conversion, color correction, and edge enhancement.

The edge blending unit 330 applies edge blending processing to the image processing signal s304 in accordance with an instruction from the CPU 110, and outputs a resultant dimmed signal s305 to the deformation processing unit 340. Note that when the edge blending processing is not applied, the edge blending unit 330 may output the image processing signal s304 as-is as the dimmed signal s305.

As stated earlier, the edge blending processing is processing for reducing the brightness of an area that overlaps another projected image (an edge blending area) so as to prevent the occurrence of an unnatural brightness difference between an edge blending area and a non-edge blending area of a projected image. For example, the edge blending unit 330 dims an edge blending area so as to gradually reduce the brightness from a boundary between the edge blending area and a non-edge blending area toward an edge portion.

Dimming processing executed by the edge blending unit 330 will now be described in more detail using FIGS. 4 and 5. For ease of explanation, it will be assumed that the projector and a projection surface (herein, a screen) face each other.

Figure 4:
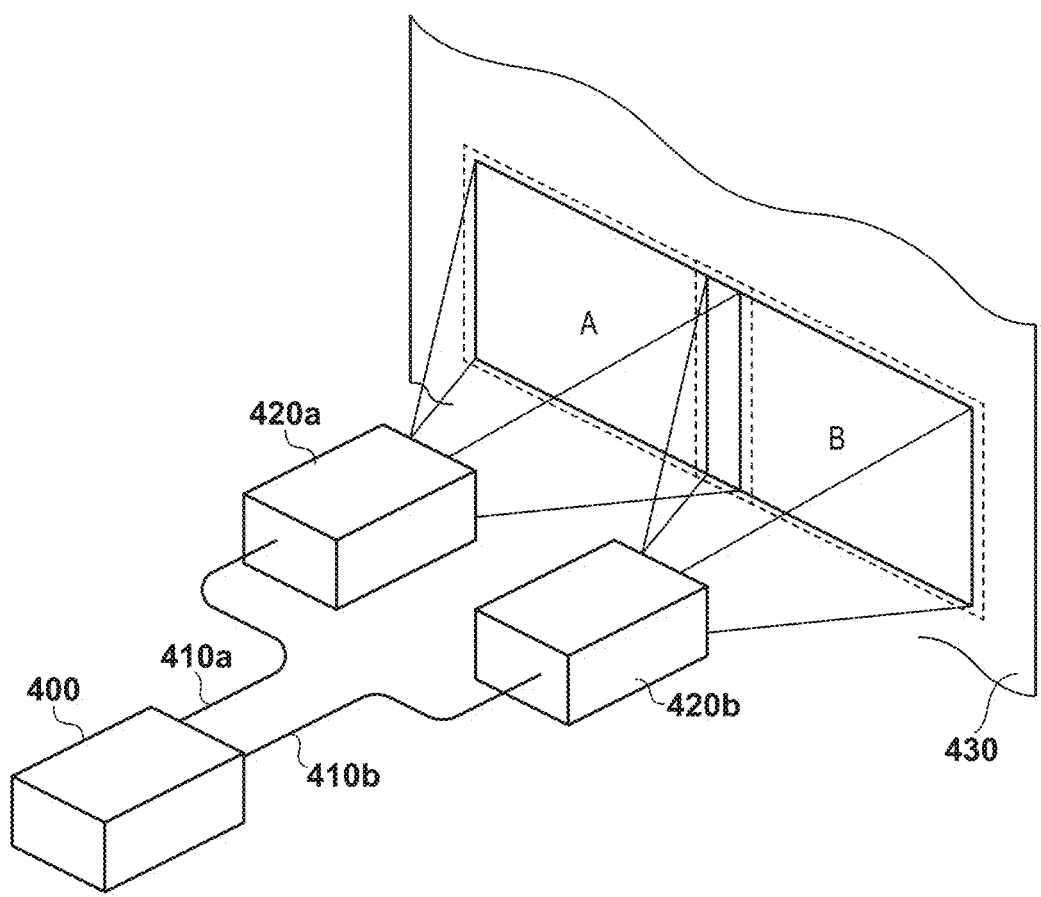
FIG. 4 is a perspective view schematically showing an example of a multi-screen projection system that uses projectors according to embodiments.

FIG. 4 is a perspective view showing an overview of a multi-screen projection system including two projectors that are lined up in a horizontal direction. An image signal source 400 is connected to projectors 420a and 420b via cables 410a and 410b, respectively. In order to achieve multi-screen projection using the projectors 420a and 420b, the image signal source 400 supplies, to the projectors 420a and 420b, images with contents that partially overlap at neighboring portions.

The projectors 420a and 420b execute projection operations based on input image signals, that is to say, image signals supplied from the image signal source 400. The projectors 420a and 420b are set up in such a manner that their projection ranges partially overlap in the horizontal direction on a screen 430. For example, by setting an overlapping range of the image signals supplied from the image signal source 400 to match an overlapping range of the projection ranges, projected images A and B of the projectors 420a and 420b are viewed as one continuous image. At this time, the brightness of the overlapping projection range is adjusted by the edge blending processing.

Figure 5:
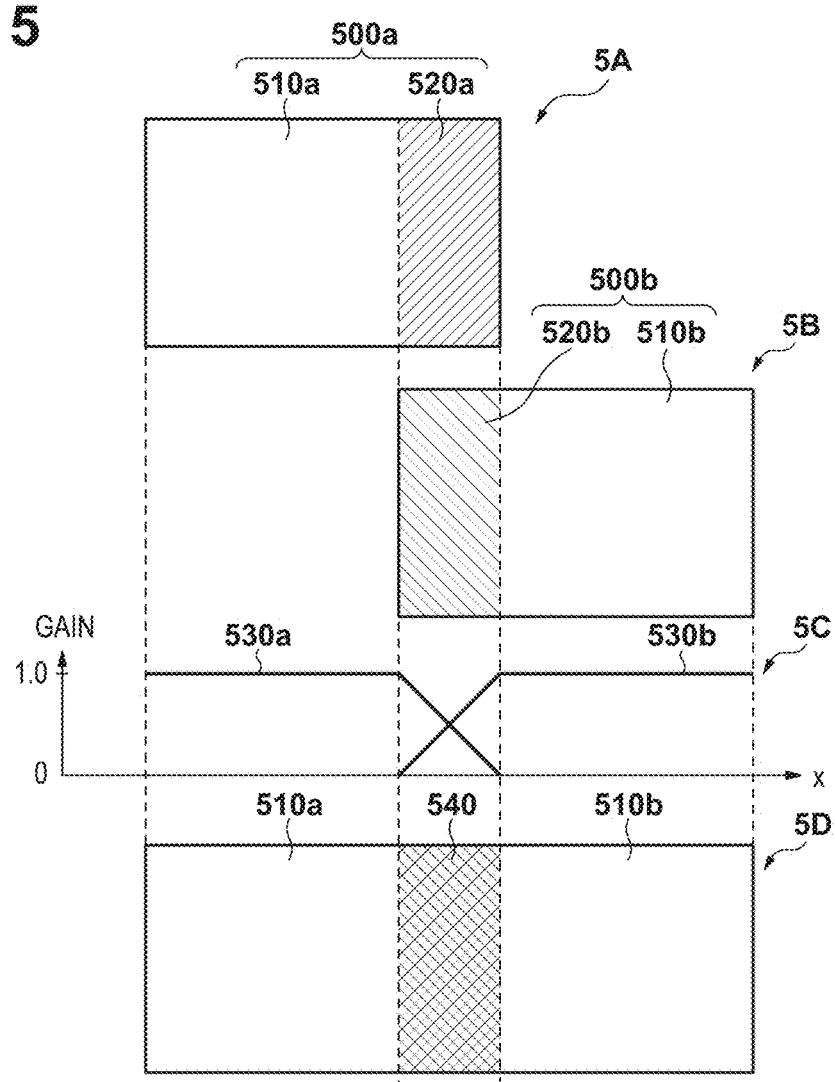
FIG. 5 is a diagram for describing processing executed by an edge blending unit according to embodiments.

In FIG. 5, 5A shows a projected image 500a of the projector 420a. The projected image 500a is composed of a non-overlapping area 510a and an overlapping area 520a. 5B shows a projected image 500b of the projector 420b. The projected image 500b is composed of a non-overlapping area 510b and an overlapping area 520b.

5C shows examples of gains that are applied by the edge blending unit 330 to image processing signals s304, specifically, gains 530a and 530b that are applied in the projectors 420a and 420b, respectively. Gains are coefficients applied to signal levels, and the brightness is reduced by applying a gain smaller than one. According to the examples of 5C, as gains that yield a one-fold increase are applied to parts of the image processing signals corresponding to the non-overlapping areas 510a and 510b, these non-overlapping areas do not change in brightness. On the other hand, gains that decrease at a constant rate depending on the position in the horizontal direction are applied to the overlapping areas 520a and 520b; specifically, these gains yield a one-fold increase at boundaries with the non-overlapping areas, and a zero increase at the edges of the projected images. Accordingly, the gains applied to the overlapping areas 520a and 520b together yield a one-fold increase, in other words, they are equal to the gains applied to the non-overlapping areas 510a and 510b. Note that each of the gains applied to the parts of the image processing signals corresponding to the overlapping areas need not decrease linearly, and may decrease along an S-curve.

5D shows the projected images 510a and 510b that have been adjusted in position. Although both of the overlapping areas 520a and 520b are projected as an overlapping area 540, a joint portion between the projected images 510a and 510b appears less distracting because its brightness has been adjusted by the edge blending processing.

Returning to FIG. 3, the deformation processing unit 340 applies deformation processing for keystone correction to the dimmed signal s305, and outputs a resultant deformed image signal s306. As the keystone correction can be implemented by projective transformation, the CPU 110 inputs parameters for projective transformation. Coordinates (xs, ys) in an original image change into coordinates (xd, yd) in a deformed image in accordance with the following Expression 1.

$$\begin{bmatrix} xd \\ yd \\ 1 \end{bmatrix} = M \begin{bmatrix} xs - xso \\ ys - yso \\ 1 \end{bmatrix} + \begin{bmatrix} xdo \\ ydo \\ 0 \end{bmatrix} \qquad (1)$$

Figure 6:
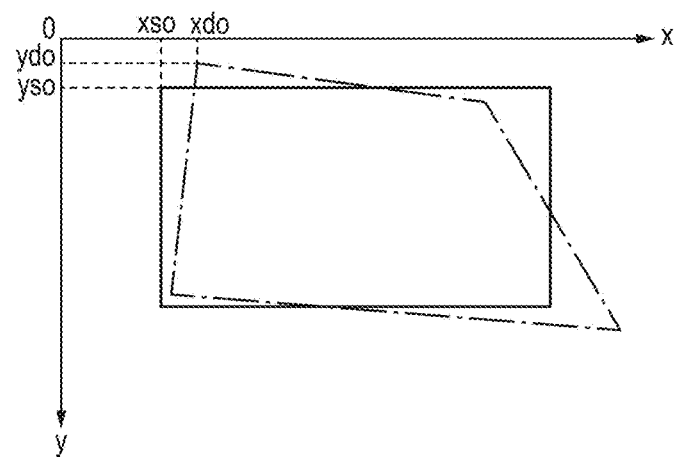
FIG. 6 is a diagram for describing processing executed by a deformation processing unit according to embodiments.

Here, M denotes a three-by-three projective transformation matrix for transforming the original image input from the CPU 110 into the deformed image. Also, xso and yso denote coordinates of one vertex that belongs to the original image indicated by a solid line in FIG. 6, whereas xdo and ydo denote coordinate values of a vertex that belongs to the deformed image indicated by a chain line in FIG. 6 and corresponds to the vertex (xso, yso) of the original image.

The CPU 110 inputs an inverse matrix $M^{-1}$ of the matrix M shown in Expression 1, as well as an offset defined by (xso, yso) and (xdo, ydo). The deformation processing unit 340 obtains coordinates (xs, ys) in the original image that correspond to post-deformation coordinate values (xd, yd) using the following Expression 2.

$$\begin{bmatrix} xs \\ ys \\ 1 \end{bmatrix} = M^{-1} \begin{bmatrix} xd - xdo \\ yd - ydo \\ 1 \end{bmatrix} + \begin{bmatrix} xso \\ yso \\ 0 \end{bmatrix} \quad (2)$$

When coordinates in the original image that have been obtained based on Expression 2 are integers, pixel values at coordinates (xs, ys) in the original image may be used as-is as pixel values at post-conversion coordinates (xd, yd). On the other hand, when coordinates in the original image that have been obtained based on Expression 2 are not integers, pixel values at post-conversion coordinates (xd, yd) are obtained by performing interpolation using values of surrounding pixels. The interpolation may be performed using a bilinear method, a bicubic method, or any other interpolation method. When coordinates in the original image that have been obtained based on Expression 2 are outside the range of the original image area, black or a user-designated background color is used as pixel values thereat.

The deformation processing unit 340 obtains all coordinates in the original image and pixel values thereat from the dimmed signal s305 in the foregoing manner, and outputs the deformed image signal s306.

Although the CPU 110 inputs the matrix M and its inverse matrix $M^{-1}$ to the deformation processing unit 340 in the foregoing description, alternatively, the CPU 110 may input only the inverse matrix $M^{-1}$ and the deformation processing unit 340 may obtain the matrix M. Similarly, the CPU 110 may input only the matrix M and the deformation processing unit 340 may obtain the inverse matrix $M^{-1}$.

The deformed image signal s306 output from the deformation processing unit 340 is supplied to an inappropriate black level processing unit 350. Leak light causes an inappropriate black level in the projectors, and the amount of inappropriate black in the overlapping area 540 shown in 5D is a sum of the amounts of inappropriate black in the non-overlapping areas 510a and 510b. For this reason, even if the edge blending processing is executed, black in the overlapping area 540 is displayed more brightly than black in the non-overlapping areas 510a and 510b. In view of this, the inappropriate black level processing unit 350 applies signal processing to a part of the deformed image signal s306 corresponding to a non-overlapping area to make black in the non-overlapping area equivalent to black in an overlapping area, and outputs an image signal s307 obtained through correction of the inappropriate black level.

As stated earlier, the image signal s307 obtained through correction of the inappropriate black level is supplied to the liquid crystal control unit 150 and displayed by the LCDs 151R, 151G, and 151B.

In the present embodiment, in response to access from the external device 200 via the communication unit 193, the CPU 110 generates a web page presenting a menu on an external device (hereinafter referred to as a "remote menu") that allows the external device 200 to remotely control the projector 100, and transmits the web page to the external device 200 via the communication unit 193. The web client of the external device 200 displays a menu screen on a display unit of the external device 200 by rendering the web page. Note that the remote menu may be generated by an application running on the external device 200. For example, the projector 100 can transmit model information to the external device 200, and the external device 200 can display a remote menu screen based on pieces of menu screen information that are prestored in the external device 200 in one-to-one correspondence with models.

Settings of the projector 100 can be configured also by operating, via the operation unit 113 or a remote control, a menu screen that has been displayed as an OSD screen superimposed on a projected image (hereinafter referred to as a "local menu"). However, as a change in settings related to a projected image is also reflected by the displayed local menu, a range of values settable from the local menu is limited in advance for each setting item so as not to affect the visibility of the local menu, and stored to, for example, the ROM 111. The present embodiment takes notice of the fact that a change in settings related to a projected image does not affect the visibility of a remote menu displayed on a display of an external device, and provides a remote menu that allows setting of a larger number of items and wider ranges of values than a local menu. In this way, settings can be configured with high degrees of flexibility and freedom compared with a case in which settings are configured using an OSD screen.

Figure 7:
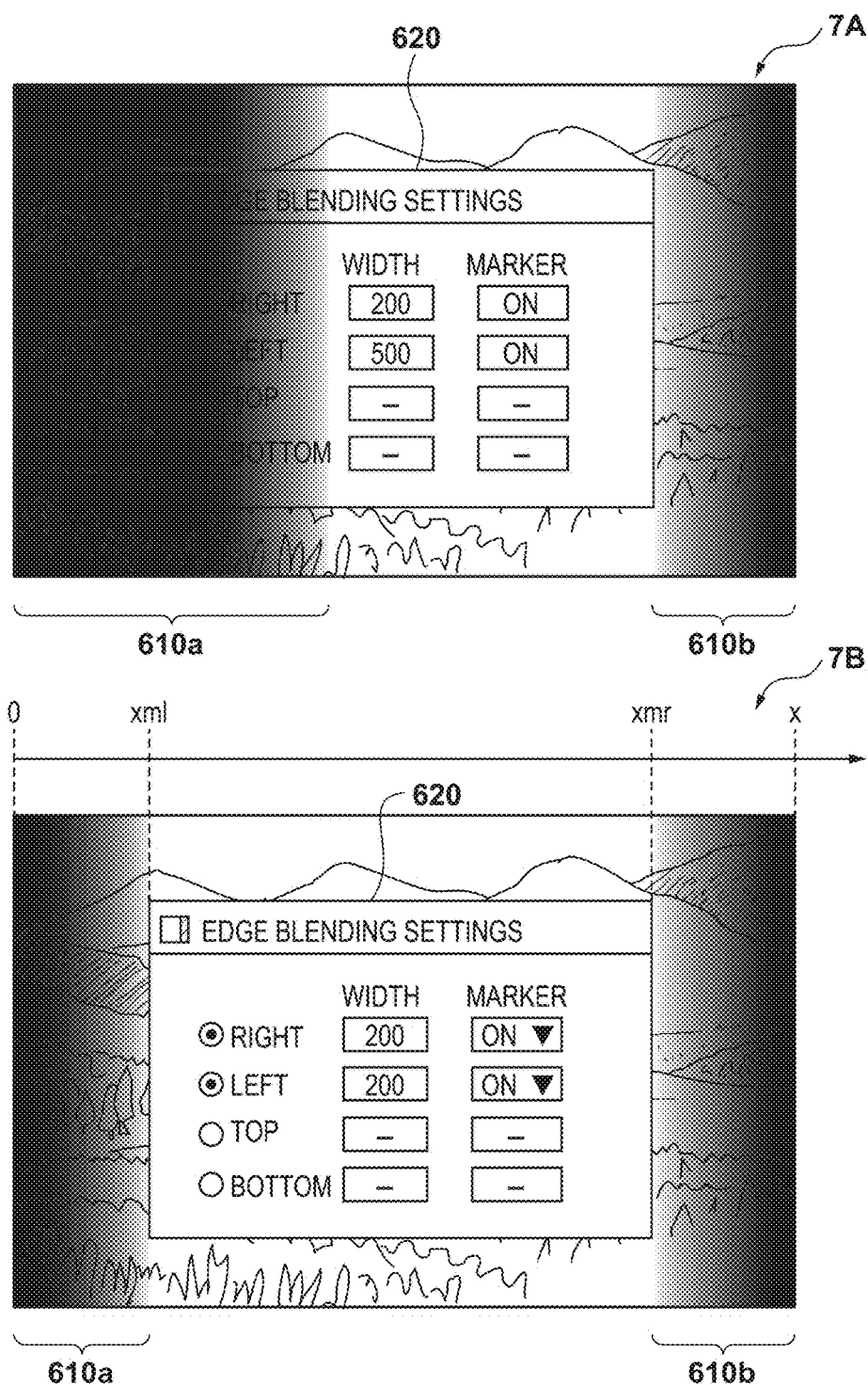
FIG. 7 shows ranges of values that are settable from a local menu according to embodiments.

Using FIG. 7, the following describes a limitation on the ranges of values that are settable from a local menu. FIG. 7 schematically shows the states in which the edge blending processing has been applied to left and right overlapping areas 610a and 610b after a local menu is superimposed as an OSD screen. In 7A, as the overlapping area 610a is set to include a display area of a local menu 620, a part of the local menu 620 has been made invisible by the edge blending processing applied to the overlapping area 610a. In this state, it is practically impossible to configure settings from the local menu 620; thus, designation of the overlapping areas (edge blending areas) from the local menu 620 should be allowed as long as they do not overlap the display area of the local menu. As shown in 7B, it will be assumed that the x-coordinate of the left edge of a projection area is 0, the horizontal resolution of the projection area is x, and the horizontal coordinates of the left edge and the right edge of the display area of the local menu 620 are xml and xmr, respectively. It will also be assumed that a width of xml or less and a width of (x−xmr) or less are settable from the local menu for the left edge blending area and the right edge blending area, respectively. When the display position of the local menu 620 can be changed, it is sufficient to allow setting of the widths of the left and right edge blending areas from the local menu 620 as long as the following relationship is satisfied: a sum of the widths of the left and right edge blending areas≤(x−(xmr−xml)).

Furthermore, with regard to setting items that could possibly reduce the visibility of the local menu, such as contrast, color-by-color gains, and γ conversion, a range of values settable from the local menu is set in advance for each item and stored to the ROM 111, similarly to the case of the edge blending processing.

When the remote menu allows setting of wider ranges than the local menu as described above, there may be a case in which setting values configured on the remote menu are unchangeable, or difficult to change, on the local menu. For example, when a setting to apply image processing that makes the local menu almost invisible has been configured from the remote menu, it is not easy to cancel such a setting from the local menu. As it is not guaranteed that an external device with a usable remote menu always exists when using a projector, there is a possibility that restoring the original settings and changing settings via a main body of the projector may not be easy depending on previous settings. The present embodiment provides a configuration that prevents such a possibility.

A description is now given of the external device 200 with a usable remote menu.

The external device 200 can communicate with the projector 100 via the communication unit 193, and the projector 100 can be remotely operated by operating the external device 200. A web client application and a remote operation application running on the external device 200 can provide a user interface for remotely operating the projector 100 from the external device 200 and functions related to transmission and reception of information, such as a request and a response. The external device 200 may be any electronic device with a display function and a communication function, such as a mobile telephone, a media player, a tablet device, a personal computer, and a game console.

Figure 8:
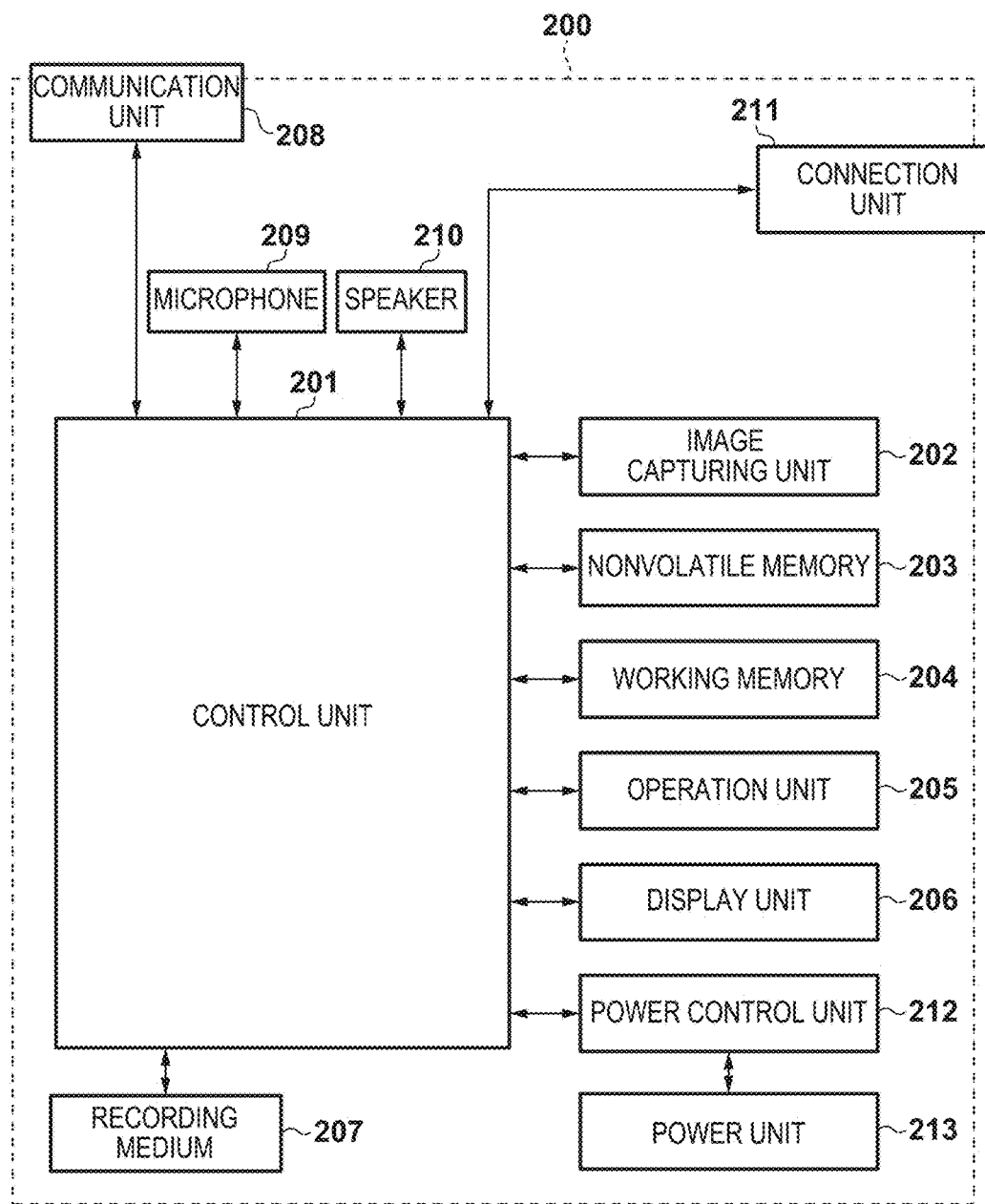
FIG. 8 is a block diagram showing an exemplary configuration of an external device shown in FIG. 1.
Figure 9:
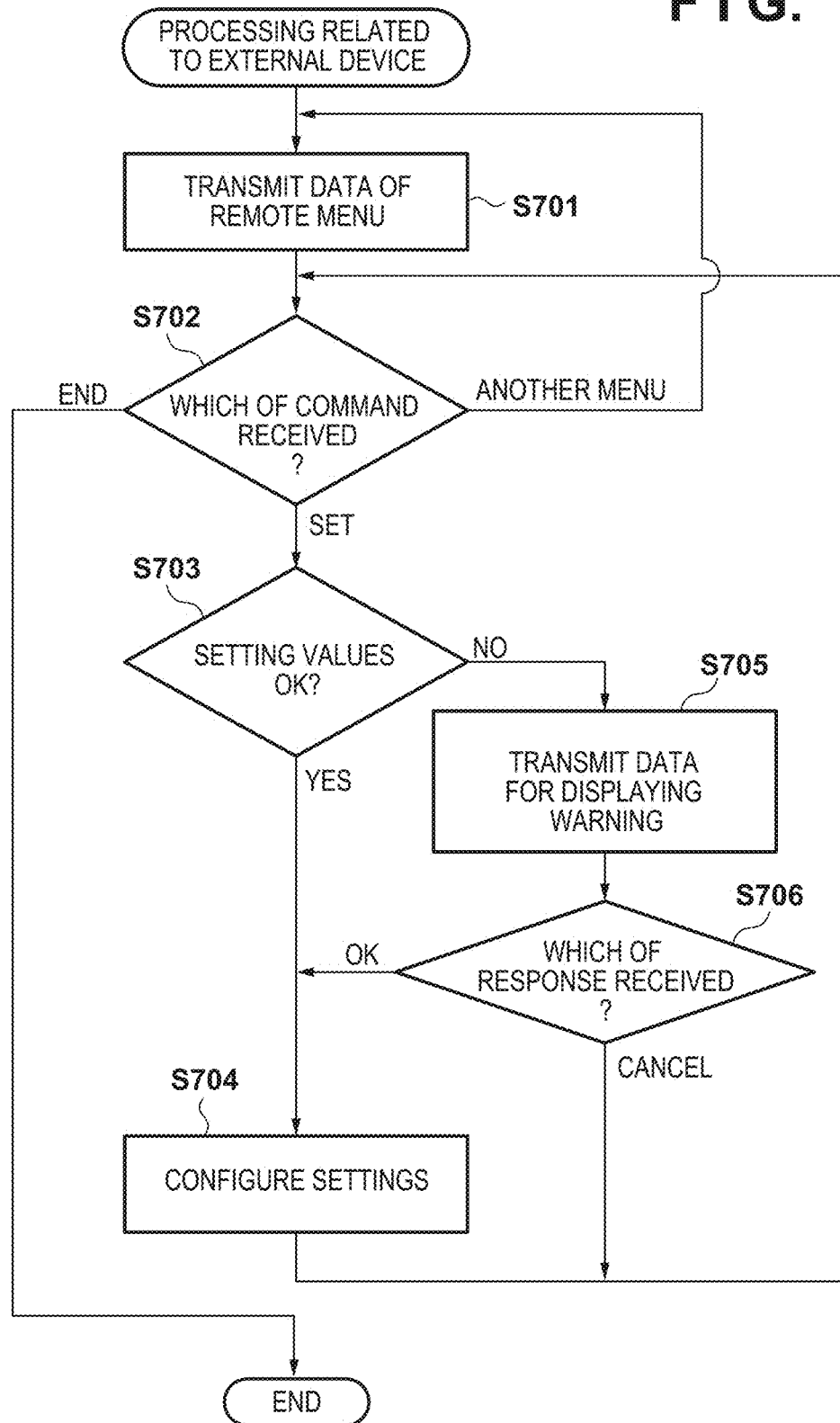
FIG. 9 is a flowchart of processing that is executed in relation to the external device in a first embodiment.

FIG. 8 is a block diagram showing an exemplary functional configuration of the external device 200. The external device 200 includes a communication unit 208 that can communicate with the communication unit 193 of the projector 100. Although the communication units 193 and 208 may communicate with each other using either a wireless medium or a wired medium, it will be assumed herein that they use a wireless medium.

The external device 200 includes a display unit 206, and displays a remote menu for remotely operating the projector 100 on the display unit 206. The remote menu is described using, for example, HTML, and rendered by the web client to display a menu screen including a GUI that can be operated (clicked or tapped). A web server included in the projector 100 is notified of a GUI operation.

A control unit 201 includes, for example, one or more programmable processors (hereinafter referred to as a CPU for the sake of convenience). Programs stored in a nonvolatile memory 203 are read in and executed by the CPU of the control unit 201; as a result, communication with the projector 100 is started, and various functions of the external device 200 are implemented. The nonvolatile memory 203 stores programs (an OS and applications) executed by the control unit 201, various setting values, GUI data, and so forth. An operation to control the entirety of the external device 200 may be shared by a plurality of items of hardware, rather than being executed by the control unit 201.

The operations of the external device 200 related to remote controlling of the projector 100 are implemented by the control unit 201 executing a program that is stored in the nonvolatile memory 203 as a remote operation application (or a web browser application). The remote operation application implements transmission of a control command to the projector 100, interpretation and execution of information received from the projector 100, display of a GUI, execution of processing corresponding to a GUI operation, and so forth. The OS running on the external device 200 may include programs for implementing the operations of the external device 200 according to the present embodiment.

An image capturing unit 202 is a camera module similar to the image capturing unit 194, includes an imaging optical system and an image sensor, and outputs image data obtained through shooting based on an instruction from the control unit 201 to the control unit 201. The control unit 201 applies, to the image data, processing that is similar to processing executed by an ordinary digital camera, and temporarily stores the resultant image data to a working memory 204. Thereafter, the image data is stored to an image file compliant with a preset recording format, and recorded on a recording medium 207.

The working memory 204 is used as a buffer memory that temporarily stores image data generated by the image capturing unit 202, a display memory (video memory) for the display unit 206, a working area for the control unit 201, and so forth.

The operation unit 205 is a group of input devices that allow a user to input instructions to the external device 200. The operation unit 205 includes, for example, a power switch, a shutter button of the image capturing unit 202, and a touchscreen provided in the display unit 206.

The display unit 206 is used to display image data obtained by the image capturing unit 202, a user interface for interactive operations, text messages, information related to calls, and so forth. Note that the display unit 206 need not necessarily be built in the external device 200. It is sufficient that the external device 200 be connectable to the display unit 206 and be provided with a function of controlling display on the display unit 206.

The recording medium 207 is a nonvolatile storage medium, such as a memory card, and can record image data obtained by the image capturing unit 202, data and address books received by the external device 200, and so forth. The recording medium 207 may be attachable to and removable from the external device 200, or may be built in the external device 200. That is to say, it is sufficient that the external device 200 be capable of accessing at least the recording medium 207.

The communication unit 208 is an interface for performing wireless communication with the communication unit 193 of the projector 100. The control unit 201 implements wireless communication with the projector 100 by controlling the communication unit 208. A microphone 209 and a speaker 210 handle inputting and outputting of voice signals. A connection unit 211 is an interface for connecting to an external apparatus.

A power control unit 212 detects, for example, a mounting state, a type, a remaining power level, the number of charge and discharge cycles, and a voltage of a power unit 213. The power control unit 212 also supplies necessary voltages to constituents for a necessary period of time based on the detection results and an instruction from the control unit 201. For example, the power unit 213 is constituted by: a primary battery, such as an alkaline battery and a lithium battery; a secondary battery, such as a NiCd battery, a NiMH battery, and a Li-ion battery; or an AC adaptor.

Using FIGS. 9 to 13, the following describes the operations that are executed by the projector 100 according to the present embodiment in relation to the external device. These operations related to the external device are executed when connection with the external device 200 is established via the communication unit 193, or at an arbitrary timing after the connection. It will be assumed that the web client, or the remote operation application with a web client function, running on the external device 200 has accessed the web server implemented by the CPU 110 in a state where connection with the external device 200 has been established.

Figure 10:
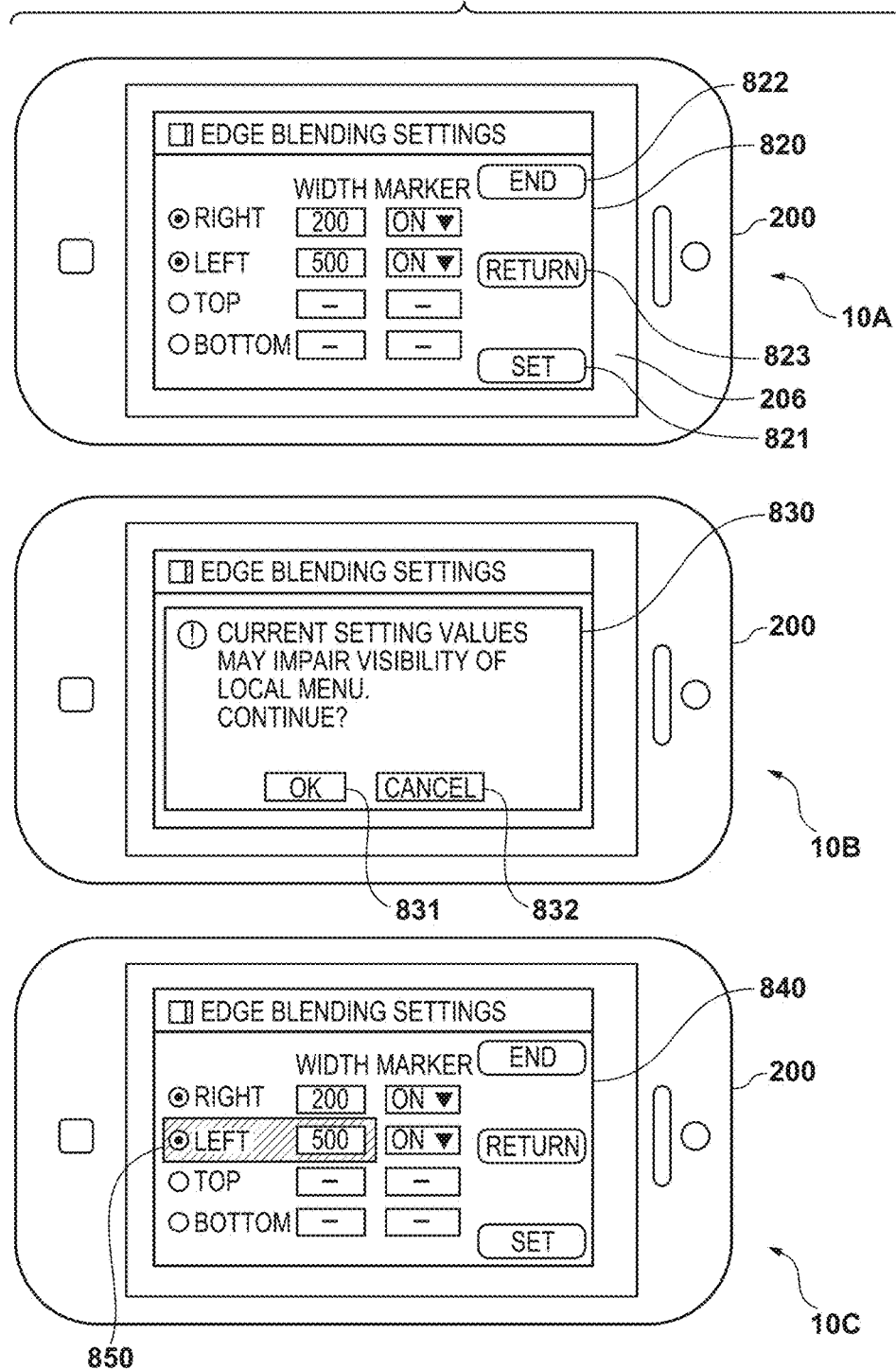
FIG. 10 shows examples of display of a remote menu according to the first embodiment.

For example, when a default URL of the web server is accessed, the CPU reads out HTML data for displaying a remote menu on the external device 200 from the ROM 111, and transmits the HTML data to the external device 200 via the communication unit 193 in step S701. Alternatively, data of remote menus may be prestored in the external device 200 in association with identification information of projectors, and the projector 100 may transmit identification information indicating its model to the external device 200. The control unit 201 of the external device 200 displays the remote menu on the display unit 206 by rendering data of the remote menu received via the communication unit 208. 10A in FIG. 10 shows an exemplary state in which the display unit 206 of the external device 200 displays an edge blending settings screen 820, which is one example of the remote menu.

When a set button 821 is operated on the edge blending settings screen 820, the control unit 201 transmits a setting command including setting values that have been input to the screen at that time to the projector 100 via the communication unit 208. When an end button 822 is operated, the control unit 201 discards the input contents, ends display of the remote menu, and transmits an ending command for ending the remote menu to the projector 100. When a return button 823 is operated, the control unit 201 switches to display of a menu in a layer immediately above. When the external device 200 does not have data of the menu in the layer immediately above, the control unit 201 transmits a menu data request command to the projector 100. Note that the edge blending settings screen shown in FIG. 10 is one example of the remote menu, and no limitation is placed on, for example, the types of the included GUI and the types of a control command that is transmitted in accordance with an operation.

In step S702, the CPU 110 monitors reception of a control command received from the external device 200 via the communication unit 193, and upon reception of the control command, ends the present processing related to the remote menu if the received control command is an ending command for ending the remote menu. If the received control command is a command that requests another menu, the CPU 110 returns to step S701, and transmits data of the requested menu to the external device 200. If the received control command is a setting command, the CPU 110 proceeds to step S703 and checks setting values.

Specifically, in step S703, the CPU 110 refers to the ROM 111, and determines whether the combinations of setting items and setting values included in the setting command fall within the ranges of setting items and setting values that are settable from a local menu. The CPU 110 proceeds to step S704 if it determines that the combinations fall within the ranges, and to step S705 if it does not determine that the combinations fall within the ranges.

In step S704, the CPU 110 changes settings in accordance with the setting command, and then returns to step S702.

In step S705, the CPU 110 transmits, to the external device 200, data of a warning screen indicating that the setting values included in the setting command impairs the visibility of the local menu. 10B in FIG. 10 shows an exemplary warning screen 830 displayed on the external device 200. When an OK button 831 or a cancel button 832 on the warning screen 830 is operated, the control unit 201 transmits a response command corresponding to the operated button.

In step S706, the CPU 110 waits for reception of the response command related to the warning screen, and when the response command is received, the present processing bifurcates in accordance with the content of the response command. The CPU 110 proceeds to step S704 and configures settings if the response command designates configuration of settings, and returns to step S702 without configuring settings if the response command designates cancellation of settings.

Although the operations related to edge blending settings have been described, similar processing can be executed for any settings screen, including a settings screen for configuring settings related to image processing for a projected image, such as contrast, color-by-color gains, and $\gamma$ conversion.

In the case of a settings screen for parameters related to $\gamma$ conversion, the ranges of values settable from the remote menu are made to be wider than the ranges of values settable from the local menu. For example, with regard to parameters that affect the brightness of the entire screen, the remote menu allows configuration of settings to make the entire screen darker than the local menu. Similarly, the remote menu allows configuration of settings to make the entire screen brighter than the local menu. Specifically, the remote menu allows configuration of settings to achieve brightness that reduces visibility to the point where the operability of the local menu is affected. On the other hand, the local menu only allows configuration of settings in ranges that give the screen brightness with which the operability of the local menu can be maintained.

Similarly, in the case of settings screens for contrast and color-by-color gains, the ranges of values that are settable as parameters are wider on the remote menu than on the local menu.

Note that when the ranges of values settable from the remote menu are made wider than the ranges of values settable from the local menu, the local menu and the remote menu may differ from each other in upper limits and/or lower limits of the settable values.

The warning screen may be projected by the projector 100 in addition to being displayed on the external device 200.

Figure 11:
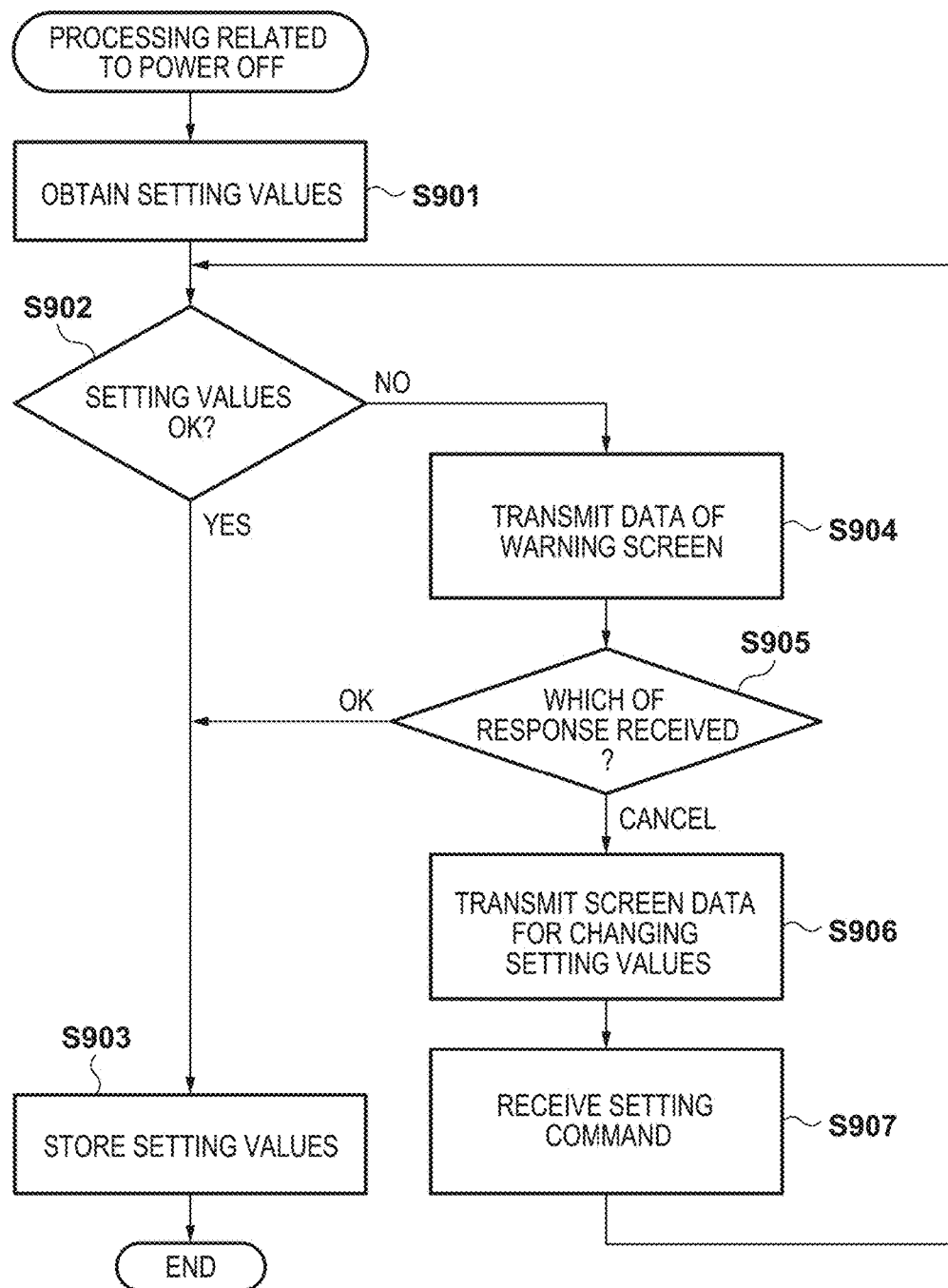
FIG. 11 is a flowchart of processing that is executed in relation to power OFF in the first embodiment.

FIG. 11 is a flowchart of operations that are executed by the CPU 110 at the time of power OFF of the projector 100. The projector 100 according to the present embodiment stores setting values at the time of power OFF, and uses the stored setting values when activated next. The processing of FIG. 11 is executed as a part of the processing for ending projection in step S206 of FIG. 2.

In step S901, the CPU 110 obtains current setting values from, for example, the RAM 112.

In step S902, the CPU 110 determines whether the combinations of setting items and setting values obtained in step S901 fall within the ranges of setting items and setting values that are settable from a local menu, similarly to step S703. The CPU 110 proceeds to step S903 if it determines that the combinations fall within the ranges, and to step S904 if it does not determine that the combinations fall within the ranges.

In step S903, the CPU 110 updates setting values in the ROM 111 to the current setting values, and ends the present processing.

In step S904, the CPU 110 transmits data of a warning screen to the external device 200 and waits for reception of a response command related to the warning screen, similarly to step S705. When the CPU 110 receives the response command, the present processing bifurcates in accordance with the content of the response command in step S905. The CPU 110 proceeds to step S903 and configure settings if the response command indicates that the current setting values are to be maintained (if the OK button 831 is operated), and proceeds to step S906 if the response command designates cancellation of settings (if the cancel button 832 is operated).

In this case also, the warning screen may be projected by the projector 100 in addition to being displayed on the external device 200.

In step S906, the CPU 110 transmits screen data for changing the setting values to the external device 200. This screen data may be data of a settings screen for a setting item corresponding to a current setting value that was not determined to fall within a range settable from the local menu in step S902. For example, when it is determined that a setting value for the left width in edge blending settings does not fall within a range settable from the local menu, the transmitted screen data is displayed on the external device 200 as shown in 10C in FIG. 10.

On a screen for changing the setting values, an item and a setting value that need to be changed are displayed in a highlighted (enhanced) manner as indicated by 850. Highlighted display may be performed using any method; for example, the item and the setting value that need to be changed may be changed in color, or may flash, when displayed.

In step S907, upon receiving a setting command from the external device 200, the CPU 110 updates the current setting values in accordance with the received setting command, and then returns to step S902 to check the setting values again. Thereafter, the CPU 110 executes the processes of step S904 and subsequent steps with respect to all setting values that were not determined to fall within the ranges settable from the local menu when step S902 was executed for the first time, and then proceeds to step S903.

Figure 12:
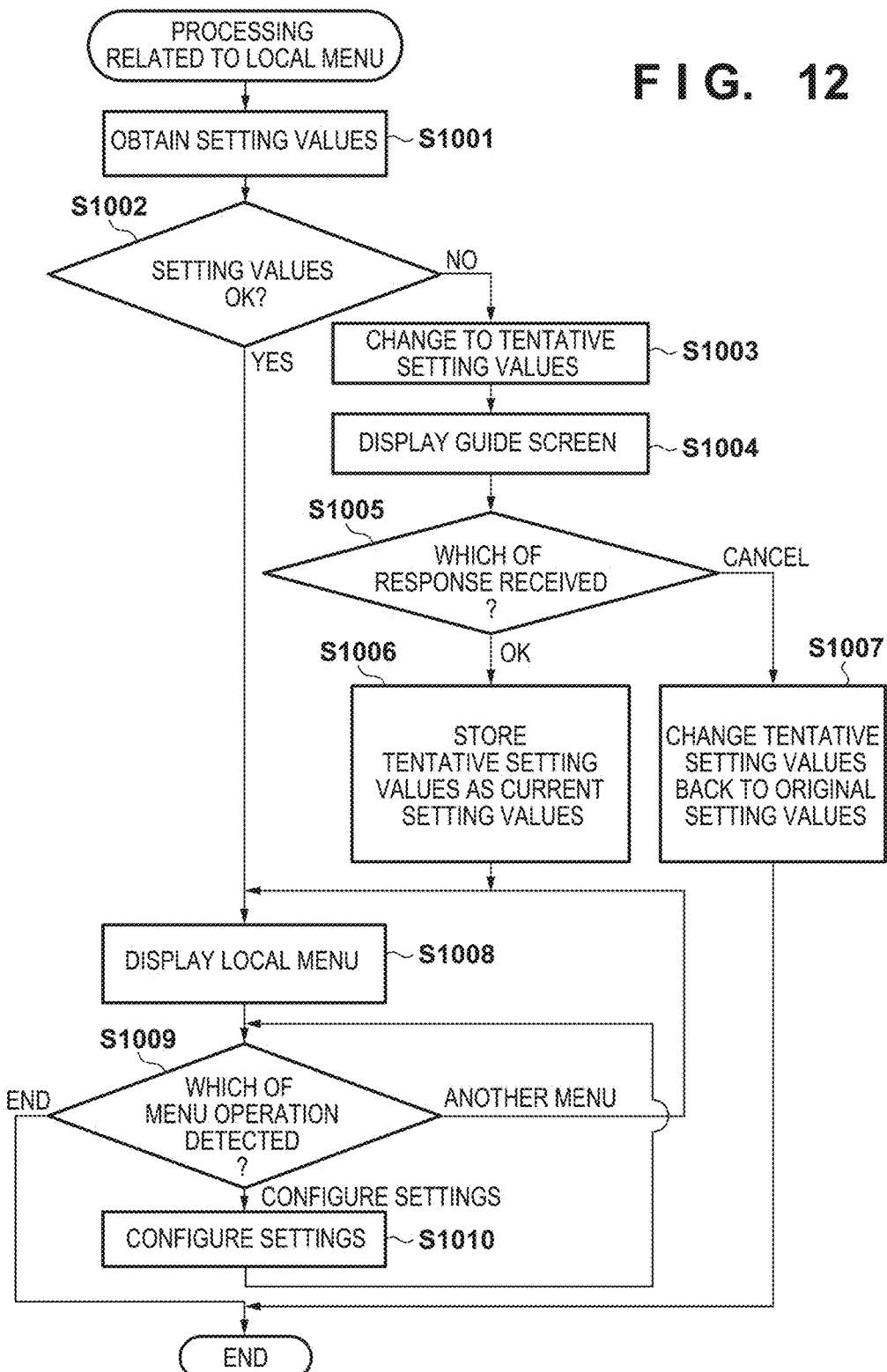
FIG. 12 is a flowchart of processing that is executed in relation to a local menu in the first embodiment.

FIG. 12 is a flowchart of operations that are executed by the CPU 110 in relation to display of and operations on a local menu. The operations of FIG. 12 are started when the operation unit 113 or a remote control has issued an instruction to display a menu screen.

In step S1001, the CPU 110 obtains current setting values from, for example, the RAM 112.

Then, the CPU 110 checks the current setting values in step S1002, similarly to steps S703 and S902.

The CPU 110 proceeds to step S1008 if it determines that all setting values fall within the ranges of values settable from the local menu, and proceeds to step S1003 if it does not determine that all setting values fall within the ranges.

Figure 13:
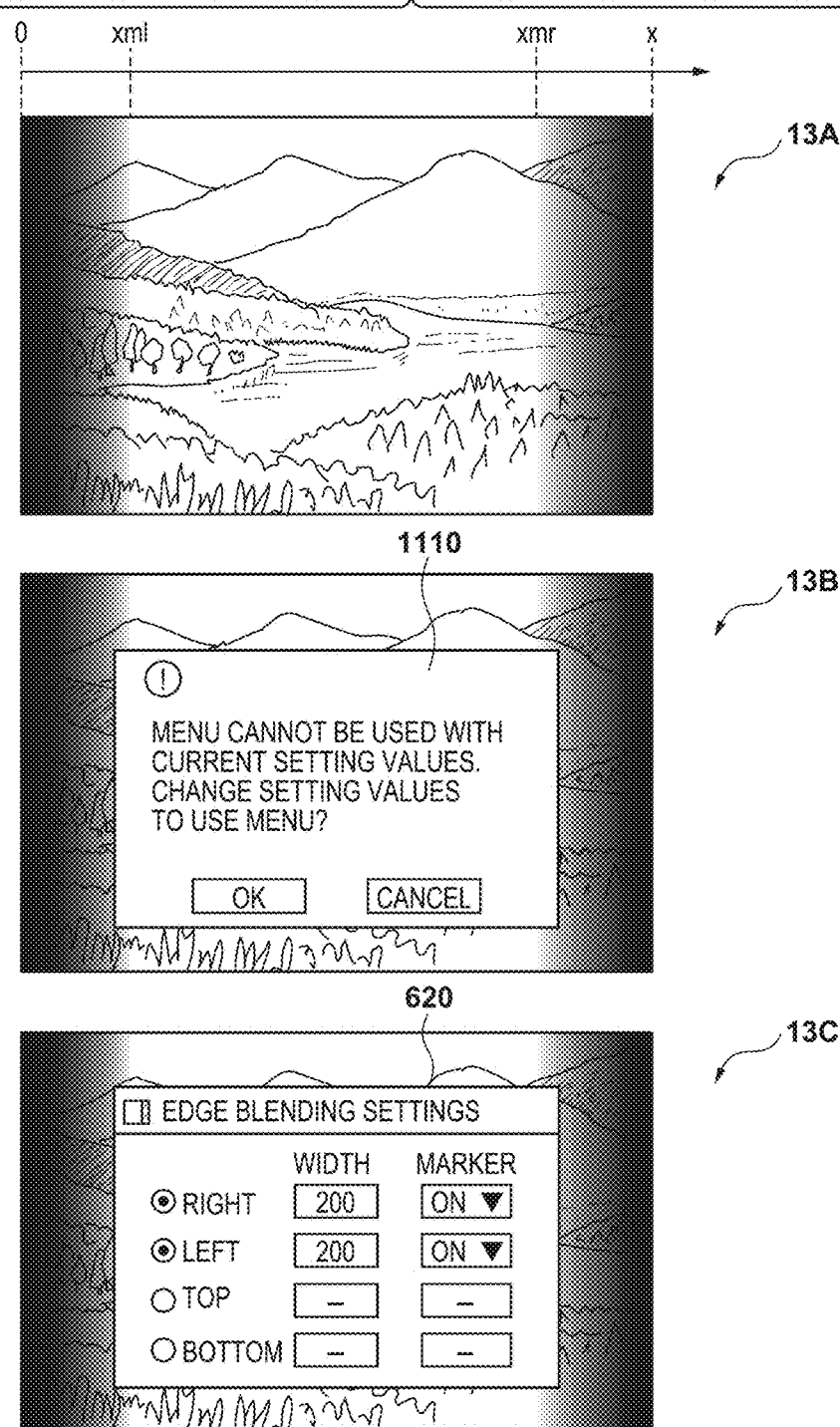
FIG. 13 is a diagram for describing the projected states of a local menu according to the first embodiment.

In step S1003, with regard to setting values that do not fall within the ranges settable from the local menu, the CPU 110 sets tentative setting values that fall within the ranges settable from the local menu to the image processing unit 140. Each tentative setting value may be, for example, a default value, or one of an upper limit and a lower limit of a range settable from the local menu that is close to a current setting value. In the latter case, for example, when the left edge blending width shown in 7A does not fall within a range settable from the local menu, a tentative setting value of xml is set for the left edge blending width. Other setting values, such as contrast, color-by-color gains, and γ conversion, are processed in a similar manner. By using the tentative setting values, an image shown in 13A in FIG. 13 is projected.

In step S1004, the CPU 110 issues a notification indicating that the use of the current setting values will disturb the use of the local menu, and makes an inquiry to a user as to whether to change the current setting values to setting values that are appropriate for the use of the local menu.

Specifically, it reads out data of a guide screen including such a notification message and inquiry message from the ROM 111, and writes the data to a predetermined area of the RAM 112. As a result, an image including a guide screen 1110 that has been superimposed as an OSD screen by the OSD superimposition unit 310 is projected (13B in FIG. 13).

In step S1005, the CPU 110 waits for reception of a response command related to the guide screen 1110. When the CPU 110 receives the response command, the present processing bifurcates in accordance with the content of the response command. The CPU 110 proceeds to step S1006 if the response command indicates a permission to change the current setting values (if the OK button 831 is operated), and proceeds to step S1007 if the response command designates the use of the current setting values (if the cancel button is operated).

In step S1007, the CPU 110 changes the tentative setting values back to the original (current) setting values, and ends the present processing without displaying the local menu. The present processing may be ended after further making an inquiry to the user as to whether to display the local menu even if the use of the local menu is disturbed. In this case, should the user wish to display the local menu, the CPU 110 proceeds to step S1008.

In step S1006, the CPU 110 stores the tentative setting values as the current setting values, and proceeds to step S1008 to display the local menu as an OSD screen. 13C in FIG. 13 shows an example of a projected image on which a local menu 620 is displayed. The visibility of this local menu has not been reduced, and thus the user can easily perform a menu operation.

In step S1009, the CPU 110 causes the present processing to bifurcate in accordance with the menu operation performed via the operation unit 113. The CPU 110 ends the present processing if the menu operation is an ending operation for ending menu display, and returns to step S1008 to display another menu as an OSD screen if the menu operation requests another menu. If the menu operation is intended to configure settings, the CPU 110 proceeds to step S1010, stores the input setting values as the current setting values, sets the current setting values to the image processing unit 140, and then returns to step S1009.

Although a warning screen is displayed at the time of power OFF in the present embodiment, no limitation is intended in this regard. For example, a warning screen may be displayed at the time of power ON. In this case, for example, if the combinations of setting items and setting values at the time of previous power OFF do not fall within the ranges of setting items and setting values that are settable from the local menu, a warning screen can be displayed at the time of next power ON.

As described above, the present embodiment uses an external device that can adjust a projected image based on ranges that are wider than ranges settable from a projected settings screen, thereby increasing a degree of freedom in adjustment compared with a case in which the external device is not used. In other words, as settings can be configured from the external device displaying a settings screen that is not affected by image processing applied to the projected image, there is no need to take into consideration the limitation placed on a settings screen included in the projected image. Furthermore, when settings that do not fall within the adjustable ranges are configured without using the external device, a warning is issued to a user, or the settings are automatically changed; thus, the user can make adjustment without any disturbance, even in an environment with no external device.

Second Embodiment

A second embodiment of the present invention will now be described. In the first embodiment, when setting values that do not fall within the ranges settable from a local menu are set on the displayed local menu, a user is informed to that effect, and the setting values are changed back to values within the ranges settable from the local menu if the user approves the change. In the present embodiment, setting values within the ranges settable from the local menu are temporarily used while the local menu is displayed, and the original setting values are restored when display of the local menu is ended.

Figure 14:
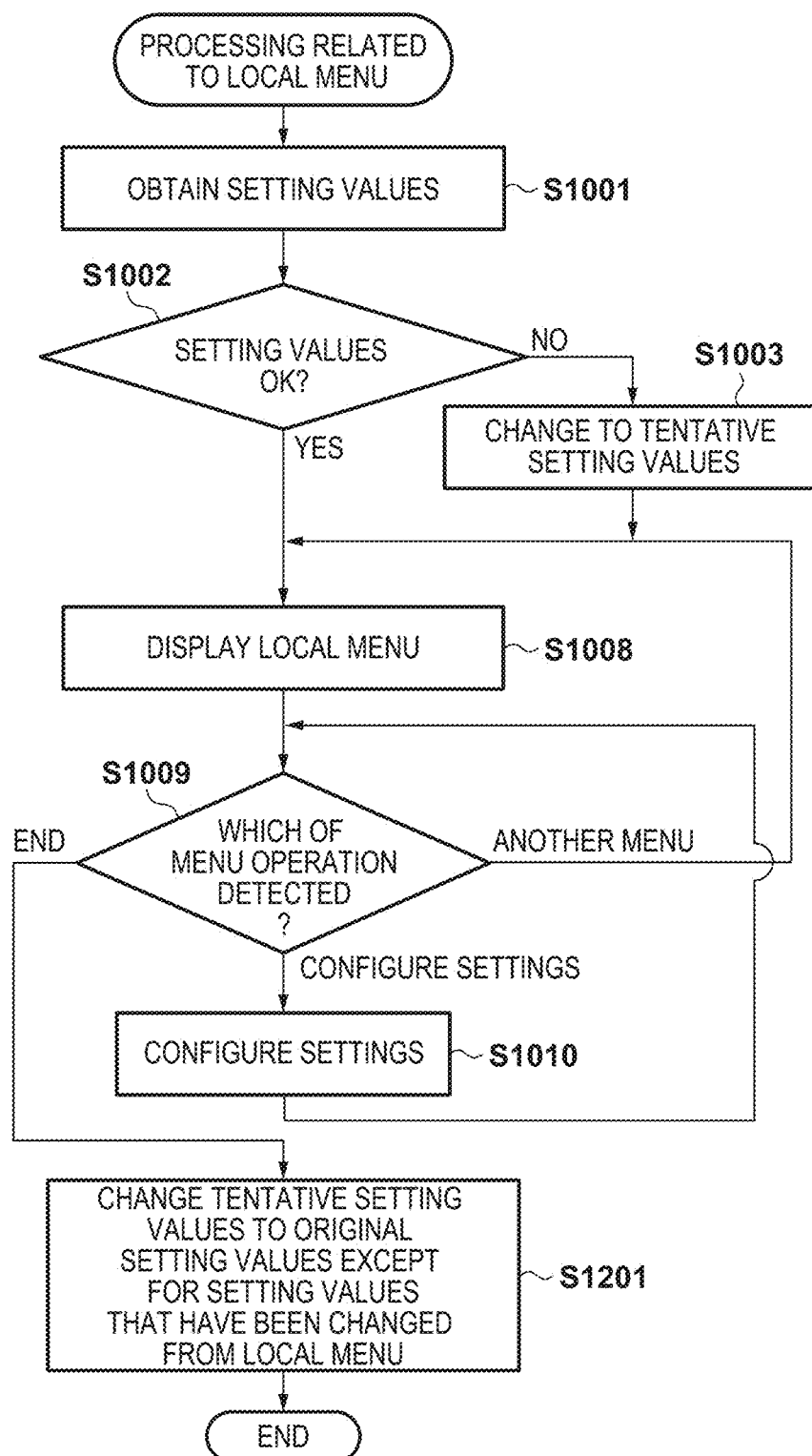
FIG. 14 is a flowchart of processing that is executed in relation to a local menu in a second embodiment.

FIG. 14 is a flowchart of operations that are executed by the CPU 110 in relation to display of and operations on a local menu. The operations of FIG. 14 are started when the operation unit 113 or a remote control has issued an instruction to display a menu screen. Processes in FIG. 14 that are similar to processes according to the first embodiment are given the same reference numerals as in FIG. 12, and overlapping explanations will be omitted.

As is apparent from comparison between FIGS. 12 and 14, in the present embodiment, after changing current setting values to tentative setting values in step S1003, the CPU 110 proceeds to step S1008 without warning a user or making an inquiry to the user about making a change to settings, and displays the local menu. Then, if an ending operation for ending display of the local menu is detected while the local menu is displayed in step S1009, the CPU 110 proceeds to step S1201. On the local menu displayed in the present embodiment, the changed values, that is to say, the tentative setting values may be displayed in a highlighted or enhanced manner so that they can be identified by the user.

In step S1201, the CPU 110 ends display of the local menu, changes the tentative setting values back to the original (current) setting values except for setting values that have been changed via the local menu, and ends the present processing.

The present embodiment can achieve the advantageous effects achieved by the first embodiment, and also allows the user to configure settings using the local menu without forcibly changing the current setting values.

Third Embodiment

A third embodiment of the present invention will now be described. In the second embodiment, when setting values that do not fall within the ranges settable from a local menu are set on the displayed local menu, the setting values are changed to tentative setting values within the ranges settable from the local menu, and the local menu is displayed in accordance with the tentative setting values. The present embodiment differs from the second embodiment in that, when the values that do not fall within the ranges settable from the local menu concern the level of a specific color, the specific color is replaced with another color in displaying the local menu.

Figure 15:
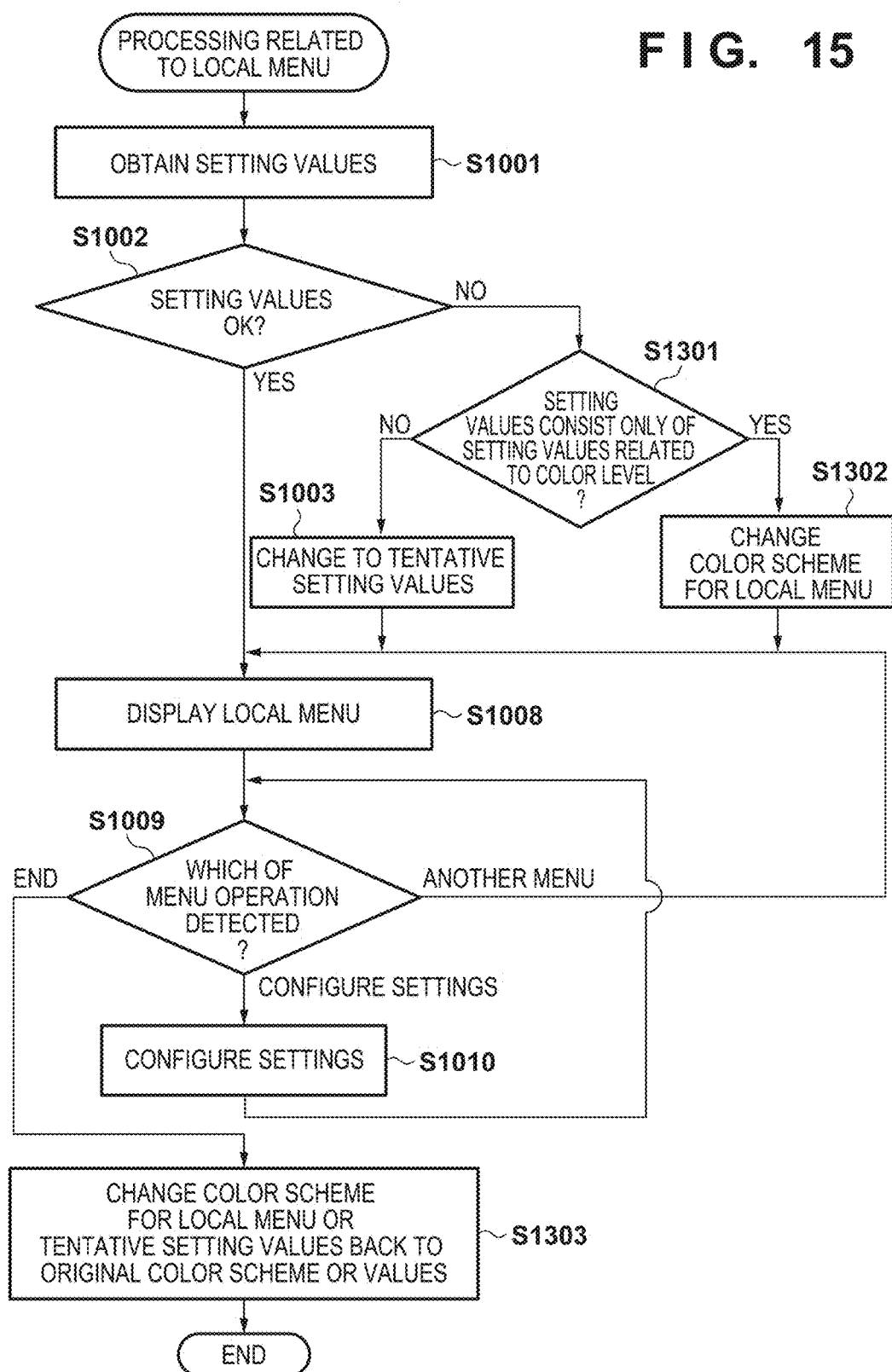
FIG. 15 is a flowchart of processing that is executed in relation to a local menu in a third embodiment.

FIG. 15 is a flowchart of operations that are executed by the CPU 110 in relation to display of and operations on a local menu. The operations of FIG. 15 are started when the operation unit 113 or a remote control has issued an instruction to display a menu screen. Processes in FIG. 15 that are similar to processes according to the first embodiment are given the same reference numerals as in FIG. 12, and overlapping explanations will be omitted.

In step S1002, if it is determined that some of the current setting values do not fall within the ranges settable from the local menu, the CPU 110 proceeds to step S1301.

In step S1301, the CPU 110 determines whether the setting values that do not fall within the ranges settable from the local menu consist only of setting values related to color adjustment, and proceeds to step S1302 if it determines that the setting values consist only of setting values related to color adjustment, and to step S1003 if it does not determine that the setting values consist only of setting values related to color adjustment. If it is determined that the setting values that do not fall within the ranges settable from the local menu include setting values corresponding to items other than color adjustment, such as setting values for an edge blending area, the subsequent processes are executed similarly to the second embodiment.

In step S1302, the CPU 110 changes a color scheme for (colors displayed on) the local menu in accordance with the items corresponding to the setting values that do not fall within the ranges settable from the local menu. In FIG. 16, 16A shows a correspondence between color numbers and color definitions. It will be assumed that colors are defined by values of R, G, and B components (0 to 255), and color numbers 0, 1, 2, 3, 4, 5, 6, and 7 correspond to black, red, green, blue, yellow, magenta, cyan, and white, respectively. 16B shows an exemplary correspondence between exemplary setting items related to color adjustment and colors (color numbers) that are affected by the setting items. These correspondences are stored in, for example, the ROM 111, and loaded to the RAM 112 for use.

16C shows an exemplary correspondence between setting items and color numbers after the color scheme has been changed in step S1302. For example, assume a case in which setting values corresponding to items that affect the visibility of red (color number 1), such as a red gain, red offset, and red gamma, have not been determined to fall within the ranges settable from the local menu. In this case, on an OSD screen serving as the local menu, a portion that was displayed using color number 1 (red) will be displayed using color number 6 (cyan) as a result of changing the color scheme in step S1302. With regard to other setting items, the color scheme is similarly changed so as to replace colors that reduce visibility with other colors during display.

In step S1008 and subsequent steps, the processes are executed similarly to the second embodiment, and if an ending operation for ending display of the local menu is detected while the local menu is displayed in step S1009, the CPU 110 proceeds to step S1303. On the local menu displayed in the present embodiment, the changed values, that is to say, the tentative setting values may be displayed in a highlighted or enhanced manner so that they can be identified by a user.

In step S1303, the CPU 110 ends display of the local menu, and if the definition of the color scheme for the local menu, which is stored in the RAM 112, has been changed, restores the original definition. The CPU 110 also changes the tentative setting values back to the original (current) setting values except for setting values that have been changed via the local menu, and ends the present processing.

The present embodiment can also achieve the advantageous effects that are similar to the advantageous effects achieved by the second embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-131037, filed on Jun. 30, 2016, which is hereby incorporated by reference herein in its entirety.

What is claimed is:

1. A display device that displays an image comprising:
a display,
a communication interface to communicate with an external device,
an input device to input an instruction by a user, and
at least one processor to perform a method comprising:
receiving information from the external device via the communication interface;
receiving the instruction inputted by a user;
setting a setting value for an image processing based on at least one of the information and the instruction, and performing the image processing to an image to be displayed on the display based on the setting value, wherein
a first range in which a parameter is settable by the setting based on the information is wider than a second range in which a parameter is settable by the setting based on the instruction.

2. The display device according to claim 1, wherein
in a case that the setting value that is set based on the information is not included in the second range, the at least one processor transmits data for displaying a warning screen on the external device to the external device via the communication interface.

3. The display device according to claim 1, wherein
in a case that current setting values include a setting value that is not included in the second range, the at least one processor transmits data for displaying a warning screen on the external device to the external device via the communication interface.

4. The display device according to claim 3, wherein
the method further comprises determining whether or not the current setting values include a setting value that are not included in the second range at the time of power OFF of the display device, at the time of power ON of the display device, or when a second setting screen for inputting the instruction is displayed on the display.

5. The display device according to claim 1, wherein
the method further comprises transmitting data for displaying a first settings screen on the external device to the external device via the communication interface, wherein the first setting screen is used for inputting the information by user.

6. The display device according to claim 1, wherein the method further comprises:
in response to inputting of the instruction determining whether or not current setting values include a target setting value that is not included in the second range, and
in a case that it is determined that the current setting values include the target setting value:
transmitting, to the external device via the communication interface, data for displaying a screen on the external device, the screen makes an inquiry to the user as to whether to change the target setting value to a setting value that is included in the second range; and
upon receiving, from the external device via the communication interface, a response indicating a permission to change the target setting value to a setting value that is included in the second range, changing the target setting value to a setting value that is included in the second range.

7. The display device according to claim 1, wherein the method further comprising:
in response to inputting of the instruction, determining whether or not current setting values include a target setting value that is not included in the second range, and
in a case that it is determined that the current setting values include the target setting value changing the target setting value to a setting value that is included in the second range and restores the original setting value.

8. The display device according to claim 1, wherein the image processing
is a gamma conversion process to an image to be displayed by the display device.

9. The display device according to claim 1, wherein the image processing is
an edge blending process in which brightness of an area along with at least one side of an image to be displayed by the display, is dimmed,
wherein the setting value is a parameter regarding a dimension of the area.

10. The display device according to claim 1, wherein the display displays the image by projecting the image on a projection plane.

11. The display device according to claim 1, wherein the external device is a tablet computing device.

12. The display device according to claim 1, wherein the image processing is a processing for changing at least one of a color and brightness of an image to be displayed by the display device.

13. The display device according to claim 1, wherein
the information has been set on a first setting screen displayed by the external device.

14. The display device according to claim 1, wherein
the instruction has been input through a second setting screen displayed on the display.

15. The display device according to claim 1, wherein
the input device is at least one of a button, a switch, a dial, and a touch panel.

16. The display device according to claim 1, wherein the external device is a personal computer.

17. The display device according to claim 1, wherein the communication interface is a wireless communication interface with the external device.

18. A method of controlling a display device that displays an image, comprising:
receiving information from an external device via a communication device, wherein the information has been set on a first settings screen displayed by the external device; and
determining a setting of the display device in accordance with the information,
wherein the first settings screen allows settings within a first range that is wider than a second range settable on a second settings screen included in the image displayed on the display device.

19. The method according to claim 18, wherein the image processing is a gamma conversation process to an image to be displayed by the display device.

20. The method according to claim 18, wherein the image processing is an edge blending process in which brightness of an area along with at least one side of an image to be displayed by the display, is dimmed,
wherein the setting value is a parameter regarding a dimension of the area.

21. The method according to claim 18, wherein the image processing is a processing for changing at least one of a color and brightness of an image to be displayed by the display device.

22. A display device that displays an image by projecting the image, the display device comprising:
a communication interface to communicate with an external device;
an input device to input an instruction by a user, and
at least one processor to perform a method comprising:
receiving information that has been set on a first settings screen displayed on the external device from the external device via the communication interface, and changing settings in accordance with the received information, the first settings screen allowing settings within first ranges that are wider than the second ranges within which settings based on the instruction are allowed; and
when settings that are not included in the second ranges are configured in accordance with the information, displaying a warning screen by projecting the warning screen, or transmitting data for displaying the warning screen on the external device to the external device via the communication interface.

23. The display device according to claim 22, wherein
the warning screen is displayed at the time of power OFF of the display device, at the time of power ON of the display device, or when the second settings screen is displayed.

24. A method of controlling a display device that includes a communication device that communicates with an external device and an operation unit that configures settings based on a second settings screen that allows settings within second ranges, the method comprising:
receiving information that has been set on a first settings screen displayed on the external device from the external device via the communication device, the first settings screen allowing settings within first ranges that are wider than the second ranges;
changing settings in accordance with the received information; and
when the information indicates settings that are not included in the second ranges, either displaying a warning screen, or transmitting data for displaying the warning screen on the external device to the external device via the communication device.

25. A non-transitory computer-readable medium having stored therein a program for causing a computer included in a display device that displays an image and comprises a communication device that communicates with an external device to function to:
receive information from the external device via the communication device, wherein the information has been set on a first settings screen displayed by the external device; and
determine a setting of the display device in accordance with the information,
wherein the first settings screen allowing settings within a first range that is wider than a second range settable on a second settings screen included in an image displayed on the display device.

26. A non-transitory computer-readable medium having stored therein a program for causing a computer included in a display device that displays an image by projecting the image and comprises a communication device that communicates with an external device and an operation device that configures settings based on a second settings screen that allows settings within second ranges, to
receive information that has been set on a first settings screen displayed on the external device from the external device via the communication device;
change settings in accordance with the received information, the first settings screen allowing settings within first ranges that are wider than the second ranges; and
when settings that do not included in the second ranges are configured in accordance with the information, display a warning screen by projecting the warning screen, or transmit data for displaying the warning screen on the external device to the external device via the communication device.

27. An electronic device that controls a display device that sets a setting value and performs an image processing to an image to be displayed on the display device based on the setting value, comprising:
a display that displays an image;
a communication interface configured to communicate with the display device;
an input device to input an instruction for setting the setting value; and
at least one processor that performs a method comprises:
displaying a first settings screen on the display for inputting the instruction by user, and
transmitting, via the communication interface, an information set based on the instruction on the first settings screen to the display device to cause the display device to set a setting value based on the information, wherein
a first range in which a parameter is settable by the electronic device is wider than a second range in which a parameter is settable by the display device.

28. The electronic device according to claim 27, wherein the method further comprises:
receiving a user operation on the first settings screen.

29. The electronic device according to claim 27, wherein the method further comprises:
requesting the display device for information for displaying the first settings screen on the display.

30. A non-transitory computer-readable medium having stored therein a program executable by a computer included in an electronic device, wherein the electronic device controls a display device that sets a setting value, performs an image processing to an image to be displayed on the display device based on the setting value, and comprises:
- a display that displays an image;
- a communication interface configured to communicate with the display device; and
- an input device to input an instruction for setting the setting value,
- wherein the program, when executed by the computer, causes the computer to perform:
  - displaying a first settings screen on the display for inputting the instruction by user, and
  - transmitting, via the communication interface, an information set based on the instruction on the first settings screen to display device cause the display device to set a setting value based on the information, wherein
- a first range in which a parameter is settable by the electronic device is wider than a second range in which a parameter is settable by the display device.

* * * * *